(12) United States Patent
Zhao

(10) Patent No.: US 10,719,551 B2
(45) Date of Patent: Jul. 21, 2020

(54) SONG DETERMINING METHOD AND DEVICE AND STORAGE MEDIUM

(71) Applicant: Tencent Technology (Shenzhen) Company Limited, Shenzhen (CN)

(72) Inventor: Weifeng Zhao, Shenzhen (CN)

(73) Assignee: Tencent Technology (Shenzhen) Company Limited, Shenzhen, Guangdong Province (CN)

(*) Notice: Subject to any disclaimer, the term of this patent is extended or adjusted under 35 U.S.C. 154(b) by 139 days.

(21) Appl. No.: 16/102,478

(22) Filed: Aug. 13, 2018

(65) Prior Publication Data

US 2018/0349494 A1 Dec. 6, 2018

Related U.S. Application Data

(63) Continuation of application No. PCT/CN2017/079631, filed on Apr. 6, 2017.

(30) Foreign Application Priority Data

Apr. 19, 2018 (CN) .......................... 2016 1 0244446

(51) Int. Cl.
*G06F 16/78* (2019.01)
*G06F 16/683* (2019.01)
(Continued)

(52) U.S. Cl.
CPC .......... *G06F 16/685* (2019.01); *G06F 16/634* (2019.01); *G06F 16/683* (2019.01);
(Continued)

(58) Field of Classification Search
CPC ...... H04H 60/37; G06F 16/78; G06F 16/7834
See application file for complete search history.

(56) References Cited

U.S. PATENT DOCUMENTS 5,559,949 A * 9/1996 Reimer .............. H04N 7/17318
715/720
5,809,471 A * 9/1998 Brodsky ............. G06F 16/7844
704/275
(Continued)

FOREIGN PATENT DOCUMENTS

CN 103116629 A 5/2013
CN 103440330 A 12/2013
(Continued)

OTHER PUBLICATIONS

Tencent Technology, Written Opinion, PCT/CN2017/079631, dated Jul. 11, 2017, 5 pgs.
(Continued)

*Primary Examiner* — Daniel Abebe
(74) *Attorney, Agent, or Firm* — Morgan, Lewis & Bockius LLP

(57) ABSTRACT

A song determining method and device are provided. According to the embodiment of the present disclosure, by extracting the audio file in the video and acquiring the candidate song identification of the candidate song, to which the segment belongs, in the audio file, the candidate song identification set is obtained; then by acquiring the candidate song file corresponding to the candidate song identification and acquiring a matched audio frame, in which the candidate song file is matched with the audio file, the matched audio frame unit is obtained, wherein the matched audio frame unit includes multiple continuous matched audio frames; the target song identification of the target song, to which the segment belongs, is acquired from the candidate song identification set according to the matched audio frame unit corresponding to the candidate song identification, and the target song, to which the segment belongs, is determined according to the target song identification.

20 Claims, 4 Drawing Sheets

(51) Int. Cl.
　　*G06F 16/632* (2019.01)
　　*G06F 16/783* (2019.01)
　　*G10L 25/54* (2013.01)
　　*G10L 25/18* (2013.01)
　　*H04N 21/8352* (2011.01)
　　*H04N 21/439* (2011.01)
　　*G10L 25/93* (2013.01)

(52) U.S. Cl.
　　CPC .......... *G06F 16/78* (2019.01); *G06F 16/7834* (2019.01); *G10L 25/18* (2013.01); *G10L 25/54* (2013.01); *G10L 25/93* (2013.01); *H04N 21/439* (2013.01); *H04N 21/8352* (2013.01); *G10L 2025/937* (2013.01)

(56) References Cited

U.S. PATENT DOCUMENTS

| | | | | |
|---|---|---|---|---|
| 2007/0002173 | A1* | 1/2007 | Cha | H04N 7/035 348/465 |
| 2011/0292992 | A1* | 12/2011 | Sirivara | H04N 21/23418 375/240.01 |
| 2012/0209612 | A1 | 8/2012 | Bilobrov | |
| 2013/0152144 | A1* | 6/2013 | Walker | H04N 7/17318 725/93 |

FOREIGN PATENT DOCUMENTS

| | | |
|---|---|---|
| CN | 103853836 A | 6/2014 |
| CN | 103971689 A | 8/2014 |
| CN | 104142989 A | 11/2014 |
| CN | 104409087 A | 3/2015 |
| CN | 104598541 A | 5/2015 |
| CN | 105868397 A | 8/2016 |
| WO | WO 2005101243 A1 | 10/2005 |

OTHER PUBLICATIONS

Tencent Technology, IPRP, PCT/CN2017/079631, Oct. 23, 2018, 6 pgs.

Tencent Technology, ISR, PCT/CN2017/079631, Jul. 11, 2017, 2 pgs.

So Yong-Jin et al., A Music-Fingerprinting-Based Large-Scale Music Retrieval System, The 2nd Harmonious Human-Machine Environment Academic Conference (HHME2006), 15th China Multimedia Academic Conference Proceedings (NCMT'06), Nov. 2, 2006, pp. 224-230.

Zhou Chuanping, Research on Entropy-based Music Fingerprinting System, Chinese Masters Theses Full-text Database, Information Science and Technology, Issue No. 7, Jul. 15, 2012, pp. 1138-2758.

\* cited by examiner

SONG DETERMINING METHOD AND DEVICE AND STORAGE MEDIUM

PRIORITY CLAIM AND RELATED APPLICATION

This application is a continuation-in-part application of PCT Application No. PCT/CN2017/079631, entitled "SONG DETERMINING METHOD AND DEVICE AND STORAGE MEDIUM" filed on Apr. 6, 2017, which claims priority to Chinese Patent Application No. 201610244446.8, filed with the State Intellectual Property Office of the People's Republic of China on Apr. 19, 2016, and entitled 'SONG DETERMINING METHOD AND DEVICE AND STORAGE MEDIUM," all of which are incorporated herein by reference in their entireties.

FIELD OF THE TECHNOLOGY

The present disclosure relates to an audio and video processing technology, and particularly relates to method and device and a storage medium for determining a song and supplemental content corresponding to an audio content played in a video.

BACKGROUND OF THE DISCLOSURE

Along with the development of Internet and the development of communication network, the video technology is rapidly developed accordingly, network video is widely popularized, and more and more users watch videos through network.

Currently, segments of audio contents frequently occur in some videos, then supplemental content (e.g., lyrics, captions, etc.) need to be added for the segments of the audio contents in the videos, so that the users can see the supplemental content of the segments and the user experience can be improved. For identifying and matching supplemental content for an audio content in a video, firstly, the song, to which the segment corresponds to, needs to be determined and/or positioned (i.e., the location of the segment needs to be identified in the song). Existing manners for determining or positioning the song, to which the video segment belongs, are mainly as follows: extracting a fragment of the segment in the video, then roughly matching the video segment fragment with the song in a music library, and taking the matched song as the song, to which the video segment belongs.

According to a scheme for determining or positioning the song, to which the segment belongs, provided by related technology, because the accuracy for extracting the video segment fragment is low, and a relatively simple matching manner is adopted for song matching, the accuracy for determining the song corresponding to the video segment is relatively low. Besides users need to switch among different applications, and manually identify the song and/or locate the segment in the song, which is time consuming, and has low accuracy and bad user experience.

SUMMARY

An embodiment of the present disclosure provides a song determining method and device and a storage medium, which can increase the accuracy for determining the song corresponding to the video segment.

In a first aspect of the present disclosure, the embodiment of the present disclosure provides a song determining method performed at a computing device having one or more processors and memory storing a plurality of programs to be executed by the one or more processors. While playing a video on a user interface, the computing device receives a user instruction to display a supplemental content for the video. In response to the user instruction, the computing device extracts an audio file corresponding to the audio content of the video. The computing device then obtains one or more candidate songs, to which a segment of the audio content belongs. For a respective candidate song, the computing device acquires a corresponding candidate song file and a matched audio frame from the candidate song file. The computing device matches the segment of the audio content and forms a matched audio frame unit based on one or more matched audio frames acquired based on the matches between the segment of the audio content and one or more candidate song files respectively. In some embodiments, the matched audio frame unit includes multiple continuous matched audio frames. After acquiring a target song identification from the candidate song identification set according to a match between the matched audio frame unit and a matched candidate song identification and time information associated with the target song identification, the computing device then acquires the supplemental content corresponding to the audio segment according to the target song identification. Finally, the computing device matches the supplemental content for the audio content to the video according to the target song identification and the duration, such that the supplemental content is displayed with the corresponding audio content while playing the video on the user interface.

In a second aspect of the present disclosure, the embodiments of the present disclosure provide a song determining device having one or more processors and memory storing a plurality of programs, wherein the plurality of programs, when executed by the one or more processors, cause the computing device to perform the aforementioned song determining method.

In a third aspect of the present disclosure, the embodiment of the present disclosure provides a non-transitory computer readable storage medium storing a plurality of programs in connection with a song determining device having one or more processors, wherein the plurality of programs, when executed by the one or more processors, cause the computing device to perform the afore mentioned song determining method.

According to the embodiment of the present disclosure, by extracting the audio file in the video and acquiring the candidate song identification of the candidate song, to which the segment belongs, in the audio file, the candidate song identification set is obtained; then by acquiring the candidate song file corresponding to the candidate song identification and acquiring a matched audio frame, in which the candidate song file is matched with the audio file, the matched audio frame unit is obtained, wherein the matched audio frame unit includes multiple continuous matched audio frames; the target song identification of the target song, to which the segment belongs, is acquired from the candidate song identification set according to the matched audio frame unit corresponding to the candidate song identification, and the target song, to which the segment belongs, is determined according to the target song identification.

According to the scheme, the candidate song identification set of the candidate song, to which the video segment belongs, can be acquired first, then based on the matched audio frame between the audio file and the song of the video, the identification of the song, to which the video segment belongs, is selected from the candidate song identification set, so as to determine the song, to which the video segment belongs; with respect to related technologies, the accuracy for determining or positioning the song corresponding to the video segment can be increased.

BRIEF DESCRIPTION OF THE DRAWINGS

In order to illustrate the technical scheme in the embodiment of the present disclosure more clearly, a brief introduction will be made for drawings needed in description of the embodiment, obviously, the following described drawings are only some embodiments of the present disclosure, and those skilled in the art also can acquire other drawings according to the theses drawings on the premise of not paying creative work. In drawings.

DESCRIPTION OF EMBODIMENTS

Figure 1:
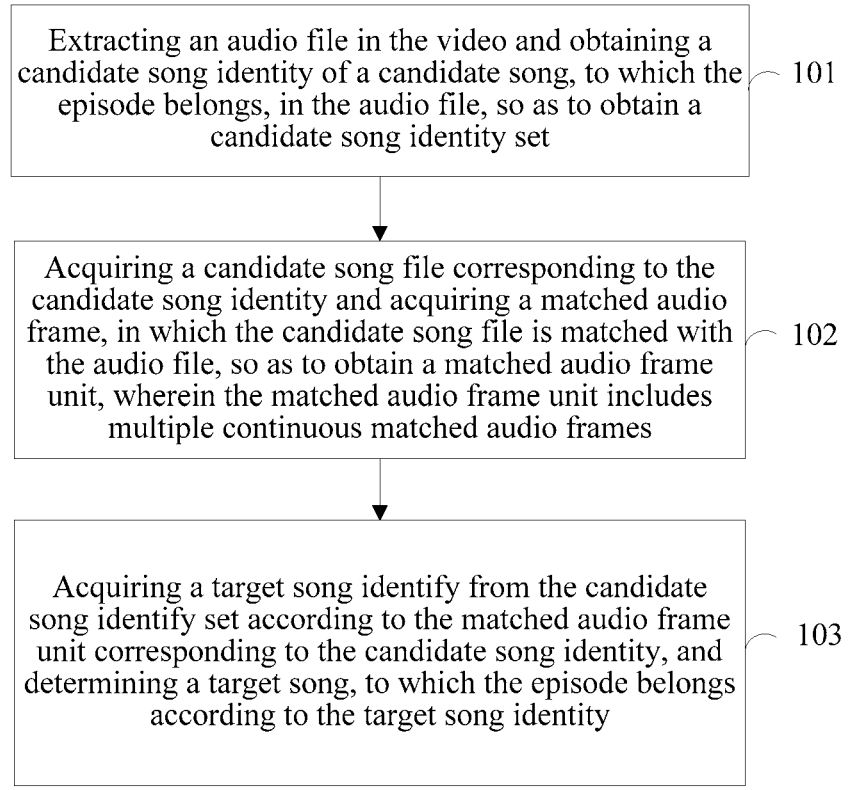
FIG. 1 is a flow diagram of a song determining method provided by the embodiment of the present disclosure.

In the following, in combination with drawings in the embodiments of the present disclosure, clear and complete description will be made for the technical scheme in the embodiments of the present disclosure, obviously, the described embodiment is only a part of embodiments of the present disclosure and not all the embodiments. On the basis of the embodiments of the present disclosure, all other embodiments obtained by those skilled in the art on the premise of not paying creative work fall within the protection scope of the present disclosure.

The embodiment of the present disclosure provides a song determining method and device, which will be described in details in the following.

According to the embodiment of the present disclosure, description will be made from the perspective of the song determining device, and specifically, the song determining device may be integrated to equipment which needs to determine a song corresponding to a video segment, such as a server.

Certainly, the song determining device may also be integrated to equipment which needs to determine the song corresponding to the video segment, such as a user terminal (for example, a smartphone and a tablet computer).

The embodiment of the present disclosure provides a song determining method, including: extracting an audio file in a video and acquiring a candidate song identification of the candidate song, to which the segment belongs, in the audio file, so as to obtain a candidate song identification set; then acquiring a candidate song file corresponding to the candidate song identification and acquiring a matched audio frame, in which the candidate song file is matched with the audio file, so as to obtain a matched audio frame unit, wherein the matched audio frame unit includes multiple continuous matched audio frames; and acquiring the identification of a target song, namely a target song identification, to which the segment belongs, from the candidate song identification set according to the matched audio frame unit corresponding to the candidate song identification, and determining a target song, to which the segment belongs, according to the target song identification.

In some embodiments, the method for determining a song corresponding to an audio content played in a video is performed at a computing device having one or more processors and memory storing a plurality of programs to be executed by the one or more processors, the method comprising: receiving a user instruction to display a supplemental content for an audio content played in a video while the user is watching the video on a user interface at a user device; in response to the user instruction, extracting an audio file corresponding to the audio content played in the video; obtaining one or more candidate song identifications of one or more candidate songs, to which a segment of the audio content belongs, so as to obtain a candidate song identification set including the one or more candidate song identifications; for a respective candidate song of the one or more candidate songs, acquiring a candidate song file corresponding to the respective candidate song identification and acquiring a matched audio frame from the candidate song file that matches the segment of the audio content; forming a matched audio frame unit based on one or more matched audio frames acquired based on matches between the segment of the audio content and one or more candidate song files of the one or more candidate songs respectively, wherein the matched audio frame unit includes multiple continuous matched audio frames; acquiring a target song identification from the candidate song identification set according to a match between the matched audio frame unit and a matched candidate song identification, comprising: performing audio frame extension on the matched audio frame unit corresponding to the candidate song identification, so as to obtain a matched song fragment corresponding to the candidate song identification; and acquiring time information corresponding to the candidate song identification according to the matched song fragment, wherein the time information includes: a first timestamp of a starting point of the matched song fragment in the video, a second timestamp of a starting point of the matched song fragment in the candidate song, and a duration of the matched song fragment; determining a target song, to which the segment of the audio content belongs according to the target song identification; acquiring the supplemental content corresponding to the segment of the audio content according to the target song identification, the corresponding first timestamp, and the duration; and matching the supplemental content for the audio content to the video according to the second timestamp corresponding to the target song identification and the duration, such that the supplemental content is displayed with the corresponding audio content while playing the video on the user interface at the user device.

As shown in FIG. 1, the specific flow of the song determining method is as follows:

Step 101, extracting the audio file in the video and acquiring a candidate song identification of the candidate song, to which the segment belongs, in the audio file, so as to obtain a candidate song identification set.

There are many manners available for acquiring the video, for example, acquiring the video by sending a request to a video server, or extracting the video from a local storage; that is, the step of extracting the audio file in the video may include:

sending a video acquiring request to the video server;

receiving a video returned by the video server according to the video acquiring request; and extracting the audio file in the video.

There are many manners available for extracting the audio file in the video, for example, performing audio and video separating processing on the video so as to obtain the audio file of the video; that is the step of extracting the audio file in the video may include:

performing audio and video separating processing on the video so as to obtain the audio file of the video.

In the embodiment of the present disclosure, the candidate song, to which the segment belongs, may be a song that is possibly matched with the video segment, and the candidate song identification is the identification of the song matched with the video segment.

There are manners available for acquiring the candidate song identification, for example, firstly dividing the audio file of the video into a plurality of audio bands, and then matching each audio band with songs (songs in a music library) so as to obtain a song matched with the video segment, and taking the identification of the song as the candidate song identification; for example, matching songs based on the audio bands and the audio fingerprints of the song (that is, the digitized feature of the audio frequency of the song); that is, the step of acquiring the candidate song identification of the candidate song, to which the segment belongs, in the audio file, may include:

dividing the audio file into a plurality of audio bands and acquiring the audio fingerprints of the audio bands;

determining whether a fingerprint sample matched with the audio fingerprint exists in a preset sample set;

if so, acquiring the song identification corresponding to the matched fingerprint sample and obtaining the song identification set corresponding to the audio bands, the song identification set including a plurality of the song identifications; and selecting the candidate song identification of the candidate song, to which the segment belongs, from the song identification set.

The detailed process of acquiring the candidate song identification will be further described in the following record of the embodiment of the present disclosure.

Step 102, acquiring the candidate song file corresponding to the candidate song identification and acquiring the matched audio frame in which the candidate song file is matched with the audio file so as to obtain a matched audio frame unit, wherein the matched audio frame unit includes multiple continuous matched audio frames.

For example, acquiring a candidate song file corresponding to the candidate song identification from a song database of a song server; for example, acquiring a corresponding song file by sending a request to the song server; that is, the step of acquiring the candidate song file corresponding to the candidate song identification may include:

sending a song acquiring request to a song server, the song acquiring request carrying the candidate song identification; and receiving a candidate song file returned by the song server according to the song acquiring request.

The matched audio frame may be that in which the candidate song file is matched with the audio file, for example, when the candidate song file includes multiple first audio frames and the audio file includes multiple second audio frame, the first audio frame, matched with the second audio frame in the audio file, in the candidate song file is the matched audio frame, similarly, the second audio frame, matched with the first audio frame in the candidate song file, in the audio file is also the matched audio frame. At the moment, the matched audio frame unit may be an audio frame unit in the candidate song file, and may also be an audio frame unit in the audio file.

Understandably, the abovementioned first audio frame is used for representing an audio frame in the candidate song so as to be compared with the audio frame (namely the second audio frame) in the audio file instead of representing a certain specific audio frame in the candidate song, similarly, the second audio frame is used for representing an audio frame in the audio file instead of representing a certain specific audio frame in the audio file.

According to the embodiment of the present disclosure, there are many manners available for acquiring the matched audio frame, for example, matching the audio frame in the candidate song with the audio frame in the audio file.

For example, a manner based on the audio feature matching of the audio frame may be adopted for audio frame matching, for example, matching the audio features of the first audio frames in the candidate song file with the audio features of the second audio frames in the audio file, and acquiring a matched audio frame according to the audio feature matching result of the audio frame; that is, the step of acquiring the matched audio frame, in which the candidate song file is matched with the audio file, so as to obtain the matched audio frame unit may include:

matching the audio features of the first audio frames in the candidate song file with the audio features of the second audio frames in the audio file so as to obtain a matching result;

acquiring the matched audio frame, in which the candidate song file is matched with the audio file, according to the matching result; and acquiring the matched audio frame unit according to the matched audio frame.

Audio features of the audio frames can be called as audio fingerprint, and there are many manners available for acquiring the audio features, for example, acquiring according to the average amplitude of the frequency band corresponding to the audio frame, that is, after the step of acquiring the corresponding candidate song file according to the candidate song identification and before the step of matching the audio features corresponding to the first audio frames in the candidate song file with the audio features corresponding to the second audio frames in the audio file, the song determining method may also include the step of acquiring the audio features corresponding to the first audio frames in the candidate song file; for example, the step of acquiring the audio features corresponding to the first audio frames in the candidate song file may include:

acquiring the frequency spectrum corresponding to each first audio frame in the candidate song file;

dividing the frequency spectrum corresponding to the first audio frame into preset number of frequency bands and acquiring the average amplitude corresponding to the frequency band;

comparing the average amplitude of each frequency band with the average amplitude of the frequency band corresponding to the last first audio frame so as to obtain a comparison result; and acquiring the audio features corresponding to the first audio frame according to the comparison result.

For example, the candidate song file is converted into an audio frequency of a preset format, such as 8 k 16-bit audio (that is, a quantized audio frequency of 16 bits, with 8*1024 sampling rate); then Fourier transformation is performed by taking a first preset number of sampling points as a frame and a second preset number of sampling points as frame shift so as to obtain a frequency spectrum (for example, Fourier transformation is performed by taking 1856 sampling points as a frame and 58 sampling points as frame shift); then the frequency spectrum is equally divided into a third preset number (for example 32) of frequency bands, and the average amplitude value corresponding to each frequency band is calculated; then each frequency band is compared with a corresponding frequency band in the last frame (the first frequency band in the second audio frame is compared with the first frequency band in the first audio frame, the second frequency band in the second audio frame is compared with the second frequency band in the first audio frame, and so forth, until all the frequency bands are compared); if the frequency band is greater than the corresponding frequency band in the last frame, the result is 1, and if the frequency band is smaller than the corresponding frequency band in the last frame, the result is 0, and therefore, each frame will obtain a data unit formed by a third preset number of bit values, and the data unit is the audio feature of the present frame; for example, under the condition of dividing the frequency spectrum into 32 frequency bands, each audio frame will obtain a data unit containing 32 bit values, and the 32 bit values are the audio feature of each audio frame.

Similarly, the audio features of the audio file in the video can also be acquired by adopting the abovementioned manner, for example, the acquiring process can be performed by referring to the abovementioned description, and unnecessary details will not be given here.

According to the embodiment of the present disclosure, there are many matching manners available for the audio features, for example, feature matching can be performed by taking a frame unit as a unit, that is, the step of matching the audio features corresponding to the first audio frames in the candidate song file with the audio features corresponding to the second audio frames in the audio file so as to obtain a matching result may include:

acquiring the frame number of the first audio frames in the candidate song file and selecting an audio frame unit from the audio file, the audio frame unit including second audio frames equaling to the frame number in quantity;

matching the audio features of the first audio frame in the candidate song file with the audio features of the second audio frame in the audio frame unit so as to obtain an audio feature matching result;

at the moment, the step of acquiring the matched audio frame, in which the candidate song file is matched with the audio file according to the matching result may include the step of acquiring the matched audio frame, in which the candidate song file is matched with the audio file according to the audio feature matching result, the matched audio frame being the audio frame successful in audio feature matching;

accordingly, the step of acquiring the matched audio frame unit according to the matched audio frame may include the step of acquiring the continuous quantity of the matched audio frames and acquiring a corresponding matched audio frame unit according to the quantity.

For example, the step of acquiring the continuous quantity of the matched audio frames and acquiring a corresponding matched audio frame unit according to the quantity may include:

obtaining a frame continuous unit according to the matched audio frame, the frame continuous unit including a plurality of the matched audio frames; and acquiring the quantity of matched audio frames in the frame continuous unit and determining the frame continuous unit as the matched audio frame unit according to the quantity.

For example, when the candidate song has n first audio frames, the audio file has m second audio frames, m is greater than n, and both m and n are positive integers, continuously selecting n second audio frames from the m second audio frames to form an audio frame unit a, then matching the audio features of the second audio frames in the audio frame unit a with the audio features of the corresponding first audio frames in the candidate song (for example, matching the audio features of the first audio frame in the audio frame unit a with the audio features of the first audio frame in the candidate song, and matching the audio features of the second audio frame in the audio frame unit a with the audio features of the second audio frame in the candidate song, and so forth, until matching the audio features of the nth audio frame in the audio frame unit a with the audio features of the nth audio frame in the candidate song), at the moment, n times of feature matching is needed, so as to obtain an audio feature matching result.

If the audio feature matching result includes a first audio frame and a second audio frame successful in audio feature matching, acquiring the matched audio frame according to the matching result and acquiring the frame continuous unit and the quantity of matched audio frames in the frame continuous unit.

Then continuously selecting another n second audio frames from the m first audio frames again to form a new audio frame unit b, wherein at least one different second audio frame exists between the audio frame unit b and the audio frame unit a (that is, at least one different audio frame exists between the new continuously selected n second audio frames and the previous continuously selected n second audio frames; for example, the audio frame unit a can be formed by selecting the first to the tenth second audio frames, and then the audio frame unit b can be formed by selecting the second to the eleventh audio frames); matching the audio features of the second audio frame in the audio frame unit b with the audio features of the corresponding first audio frame in the candidate song (for example, matching the audio features of the first audio frame in the audio frame unit b with the audio features of the first audio frame in the candidate song, matching the audio features of the second audio frame in the audio frame unit b with the audio features of the second audio frame in the candidate song, . . . , matching the audio features of the nth audio frame in the audio frame unit b with the audio features of the nth audio frame in the candidate song), so as to obtain an audio feature matching result; if the result includes the first audio frame and the second audio frame successful in audio feature matching, acquiring the matched audio frame according to the matching result and acquiring the frame continuous unit and the quantity of the matched audio frames in the frame continuous unit, . . . , and so forth; then continuously selecting another n second audio frames again to form an audio frame unit and performing audio feature matching so as to acquire the continuous quantity of the matched audio frames. Only after each of second audio frames is matched, the matching can be stopped.

After the abovementioned matching, a series of frame continuous units and the quantity of the corresponding matched audio frames can be obtained, at the moment, the frame continuous unit can be determined as the matched audio frame unit based on the quantity. For example, the frame continuous unit with the maximal quantity of the matched audio frames can be selected as the matched audio frame unit; that is, the step of determining the frame continuous unit as the matched audio frame unit according to the quantity may include the step of determining the frame continuous unit as the matched audio frame unit when the quantity of the matched audio frames of the frame continuous unit is greater than the quantity of the matched audio frame of other frame continuous units.

For example, when the candidate song has ten audio frames p, that is ten frames, and the audio file has twenty audio frames q, that is twenty frames, selecting the first to the tenth audio frames b to form a first audio frame unit; then matching the first to the tenth audio frames q (that is, the first to the tenth audio frames in the audio file) in the first audio frame unit with the ten audio frames p in the candidate song so as to obtain a matched audio frame (for example, performing feature matching between the first audio frame q in the audio frame unit and the audio frame p, . . . , performing feature matching between the tenth audio q and the tenth audio frame p); and acquiring continuous matched audio frames to form a frame continuous unit, and acquiring the quantity of the matched audio frames in the frame continuous unit.

Then selecting the second to the eleventh audio frames q in the audio file to form a second audio frame unit, then matching the first to the tenth audio frames q (that is the second to the eleventh audio frames q in the audio file) in the second audio frame unit with the ten audio frames p so as to obtain a matched audio frame, acquiring continuous matched audio frames to form a frame continuous unit, and acquiring the quantity of the matched audio frames in the frame continuous unit, and so forth, until selecting the eleventh to the twentieth audio frames to form the audio frame unit to perform feature matching.

After the abovementioned matching, a plurality of frame continuous units and the quantity of the corresponding matched audio frames can be obtained, at the moment, the frame continuous unit with the maximal quantity of matched audio frames can be selected as the matched audio frame unit, that is, the longest frame continuous unit is selected as the matched audio frame unit.

Step 103, acquiring the target song identification of the target song, to which the segment belongs, from the candidate song identification set according to the matched audio frame unit corresponding to the candidate song identification, and determining the target song identification as the target song, to which the segment belongs, according to the target song identification.

According to step 102, the matched audio frame unit, namely the matched audio frame unit corresponding to each candidate song identification, in which the candidate song file corresponding to the candidate song identification is matched with the audio file, can be acquired, and therefore, the target song identification of the target song, to which the video segment belong, can be selected from the candidate song identification set according to the matched audio frame unit corresponding to the candidate song identification.

For example, performing frame extension on the matched audio frame unit to obtain a matched song fragment, in which the candidate song file is matched with the audio file, and then acquiring the target song identification based on the matched song fragment; that is, the step of acquiring the target song identification of the target song, to which the segment belongs, from the candidate song identification set according to the matched audio frame unit corresponding to the candidate song identification may include:

performing audio frame extension on the matched audio frame unit corresponding to the candidate song identification so as to obtain the matched song fragment corresponding to the candidate song identification;

acquiring time information corresponding to the candidate song identification according to the matched song fragment, the time information including: first start time of the matched song fragment in the video, second start time of the matched song fragment in the candidate song and the duration of the matched song fragment; and acquiring the target song identification of the target song, to which the segment belongs, from the candidate song identification set according to the time information corresponding to the candidate identification.

It can be understood that the first start time is used for representing the start time of the matched song fragment in the video, so as to be distinguished from the start time (namely the second start time) of the matched song fragment in the candidate song, instead of being used for specifically referring to a certain time.

According to the abovementioned, the matched song fragment corresponding to the candidate song identification is the matched song fragment, in which the candidate song corresponding to the candidate song identification is matched with the audio file, and the matched song fragment may be a song fragment in the candidate song, and may also be a song fragment in the audio file. According to the embodiment of the present disclosure, because the matched song fragment is formed by audio frames, after the matched song fragment is acquired, the start time of the fragment in the candidate song, the start time of the fragment in the video and the duration of the fragment (namely the length of the fragment) can be acquired according to the audio frame in the fragment.

For example, the start time of the fragment in the candidate song can be acquired according to the serial number of the audio frame of the fragment in the song, and the start time of the fragment in the video can be obtained according to the serial number of the audio frame of the fragment in the audio file.

According to the embodiment of the present disclosure, there are many manners available for performing frame extension on the matched audio frame unit, for example, respectively performing frame extension in the candidate song file and the audio file, that is, the step of performing audio frame extension on the matched audio frame unit corresponding to the candidate song identification so as to obtain the matched song fragment corresponding to the candidate song identification may include:

respectively performing audio frame extension on the matched audio frame unit in the candidate song file and the audio file so as to obtain a first matched audio frame extension unit in the candidate song file and a second matched audio frame extension unit in the audio file;

matching the audio features of the first audio frames in the first matched audio frame extension unit with the audio features of the second audio frames in the second matched audio frame extension unit so as to obtain the matched audio frame of the extension units; and determining the first matched audio frame extension unit or the second matched audio frame extension unit as the matched song fragment, in which the candidate song is matched with the audio file, according to the quantity of the matched audio frames between the extension units.

In an implementation manner of the embodiment of the present disclosure, frame extension can be synchronously performed on the candidate song files and the audio files, that is, the extension audio frame number is the same, and the direction is the same.

According to the abovementioned, there are many manners available for determining the matched song fragment according to the number of the matched audio frames between the extension units, for example, when the number is greater than a certain preset number, determining the current extension unit as the matched song fragment, for another example, when the ratio between the quantity of the matched audio frame and the total quantity of the audio frames of the extension units is greater than a preset ratio (such as 90%), determining the current extension unit as the matched song fragment.

Under the condition of acquiring the time information corresponding to the candidate song identification, the step of acquiring the target song identification from the candidate song identification set according to the time information corresponding to the candidate identification may include:

acquiring the playing time corresponding to the candidate song identification according to the corresponding second start time of the candidate song identification and the duration, the playing time being the playing time of the matched song fragment in the video;

filtering the candidate song identification in the candidate song identification set according to the playing time corresponding to the candidate song identification, so as to obtain a filtered candidate identification set; and taking the candidate song in the filtered candidate identification set as the target song identification.

For example, after acquiring the corresponding playing time of the candidate song identification, the candidate song identification with the playing time having an inclusion relationship can be determined, then the candidate song identification with the playing time included can be filtered out, that is, the candidate song identifications with shorter playing time in the candidate song identification with the playing time having the inclusion relationship are filtered out; for example, when the corresponding playing time of the song ID1 is from the first second to the tenth second, the corresponding playing time of the song ID2 is from the second to the fifth second, and the corresponding playing time of the song ID3 is from the third second to the eighth second, the corresponding playing time of the songs ID1, ID2 and ID3 has the inclusion relationship, and therefore, the song ID with relatively short playing time can be filtered out, and here, the songs ID2 and ID3 are filtered out.

For another example, after acquiring the corresponding playing time of the candidate song identification, the candidate song identifications with playing time having an overlapping relationship can be determined, and then the candidate song identification with relatively short playing duration can be filtered out. For example, when the corresponding playing time of the song ID is from the first second to the tenth second, and the corresponding playing time of the song ID2 is from the fifth second to the twelfth second, the song ID with short playing duration can be filtered out, and here, the playing duration of the song ID1 is ten seconds, and the playing duration of the song ID2 is seven seconds, and therefore, the song ID2 is filtered out.

According to the embodiment of the present disclosure, after acquiring the target song identification, the song corresponding to the target song identification can be used as the target song, to which the segment belongs.

In an implementation manner of the embodiment of the present disclosure, after acquiring the target song identification corresponding to the video segment, the supplemental content of the video segment can be filled into the video, so that the supplemental content of the video segment can be displayed when the video segment is played; that is, after step 103, the method may further include:

filling (e.g., matching, associating) the supplemental content corresponding to the segment to the video according to the target song identification and the corresponding matched audio frame unit thereof.

For example, under the condition of performing extension on the matched audio frame unit to obtain the matched song fragment and the time information thereof, the step of filling the supplemental content corresponding to the segment to the video according to the target song identification and the corresponding matched audio frame unit thereof may include: according to the target song identification and the corresponding time information, acquiring the corresponding supplemental content of the segment and filling the supplemental content to the video, wherein the time information is the time information of the matched song fragment corresponding to the target song.

For example, acquiring the supplemental content corresponding to the segment according to the start time of the matched song fragment corresponding to the target song identification in the song and the duration of the matched song fragment, and filling the supplemental content according to the start time of the matched song fragment in the video and the duration; that is, the step of acquiring the supplemental content corresponding to the segment according to the target song identification and the corresponding time information and filling the supplemental content to the video may include:

acquiring the supplemental content corresponding to the segment according to the target song identification, the corresponding first start time and the duration; and filling the supplemental content to the video according to the corresponding second start time of the target song identification and the duration.

For example, a target supplemental content file of the corresponding target song can be acquired according to the target song identification, and then the supplemental content corresponding to the segment can be extracted from the target supplemental content file according to the start time of the matched song fragment in the target song and the duration of the matched song fragment; that is, the step of acquiring the supplemental content corresponding to the segment according to the target song identification, the corresponding first start time and the duration may include:

acquiring a supplemental content file of the corresponding target song according to the target song identification; and extracting corresponding supplemental content from the supplemental content file according to the corresponding first start time of the target song identification and the duration, so as to be used as the supplemental content of the segment.

For example, when the target song identification is song 1, the start time of the matched song fragment corresponding to the song 1 in the song 1 is the fifth second, and the matched song fragment lasts for ten seconds, supplemental content from the fifth second to the fifteenth second can be acquired from the supplemental content file of the song 1.

For another example, the step of filling the supplemental content to the video according to the corresponding second start time of the target song identification and the duration may include:

acquiring the showing time of the supplemental content in the video according to the corresponding second start time and duration of the target song; and filling the supplemental content to the video according to the showing time.

For example, when the second start time of the matched song fragment corresponding to the target song identification in the video is the seventh second, and the duration of the matched song fragment is eight seconds, the showing time of the supplemental content in the video is from the seventh second to the fifteenth second, and then the supplemental content can be inserted into the corresponding position in the video based on the showing time.

In an implementation manner of the embodiment of the present disclosure, in order to show segment supplemental content with complete sentences and promote user experience, whether the supplemental content are complete sentences can be determined after the segment supplemental content are acquired, if so, the supplemental content filling operation is performed; that is, after the step of acquiring the supplemental content corresponding to the segment and before the step of filling the supplemental content to the video, the method may also include:

determining whether the supplemental content are complete sentences; and if so, executing the step of filling the supplemental content to the video according to the corresponding second start time of the target song identification and the duration.

In an implementation manner of the embodiment of the present disclosure, in order to promote user experience, an interface can be set in the video, so that when the video segment is played, the song, to which the video segment belongs, can be shown by switching via the interface; that is after the step of acquiring the target song identification of the segment, the method may also include:

setting an interface in the video according to the target song identification, so that when the segment is played in a terminal, the target song, to which the segment belongs, can be shown by switching via the interface.

In some embodiments, the method further comprises: after acquiring the target song identification of the target song, to which the segment belongs, obtaining a visual indicator for display on the user interface; obtaining a user interaction (e.g., press, touch, audio input, etc.) with the visual indicator (e.g., a virtual button displayed on a touch screen); and in response to the user interaction, switching the user interface from a first application playing the video to a second application for playing the target song.

According to the abovementioned, there are many manners available for the switching interface, such as a button, an input box, etc., and the switching interface can also be set according to actual needs.

In an implementation manner of the embodiment of the present disclosure, in order to improve user experience, an interface can also be set in the video, so that the target song, to which the video segment belongs, can be added to the song list of the music software via the interface when the video segment is played, that is, after the step of acquiring the target song identification of the target song, to which the segment belongs, the method may also include:

setting an adding interface in the video according to the target song identification, so that the target song is added to the song list of the music software via the adding interface when the terminal plays the segment.

According to the abovementioned, there are many manners available for the adding interface, such as a button, an input box, etc., and the adding interface can also be set according to actual need; the music software can be common music playing software, such as music playing software based on a cloud terminal and online music playing software; and the song list can be a song menu or a song playing list, such as a collected song menu.

In some embodiments, the method further comprises:

after acquiring the target song identification, automatically adding the target song to a playlist associated with the user in a music application while playing the segment of the audio content of the video.

From the foregoing, according to the embodiment of the present disclosure, by extracting the audio file in the video and acquiring the candidate song identification of the candidate song, to which the segment belongs, in the audio file, a candidate song identification set can be obtained; then by acquiring the candidate song file corresponding to the candidate song identification and acquiring the matched audio frame, in which the candidate song file is matched with the audio file, the matched audio frame unit can be obtained, wherein the matched audio frame unit includes multiple continuous matched audio frames; and according to the matched audio frame unit corresponding to the candidate song identification, acquiring the target song identification of the target song, to which the segment belongs, from the candidate song identification set, and determining the target song, to which the segment belongs, according to the target song identification. According to the scheme, the candidate song identification set of the candidate song, to which the video segment belongs, can be acquired first, and then the identification of the song, to which the video segment belong, can be selected from the candidate song identification set based on the matched audio frame between the audio file of the video and the song, so as to determine the song, to which the video segment belongs. Relative to related technology, the accuracy and efficiency for determining or positioning the corresponding song of the video segment can be increased.

Moreover, according to the embodiment of the present disclosure, after determining the song, to which the video segment belongs, the supplemental content corresponding to the segment are matched to the video according to the target song identification and the corresponding matched audio frame unit; according to the scheme, matching between the video segment and the song can be automatically completed so as to determine the song, to which the video segment belongs, and the supplemental content of the video segment can be automatically acquired for filling. Relative to related technology, the accuracy and efficiency for filling the supplemental content of the video segment can be increased.

The present disclosure provides a solution to a need when a user is watching a video, the user provides a user input to indicate the user's interest in seeing the supplemental content (e.g., lyrics, captions, etc.) for a piece of music (e.g., an audio content, a song) while watching the video. According to the current disclosure, the user doesn't have to pause the video, or exit the software application or browser for playing the video. The user also does not need to provide additional user inputs to manually search for the supplemental content of the interested music using another application, search engine, or on a different webpage. Instead, the method provided herein can automatically identify a song which the piece of music in the video is from by matching audio fingerprints between the piece of music from the video and a pre-set audio fingerprint database including fingerprint information for a plurality of songs. The method further includes searching for lyrics of the matched song, obtaining timestamps associated with the piece of music played in the video and the relative location of the piece of music in the identified song, such that the lyrics associated with the piece of the music in the video can be obtained. The lyrics are further synchronized with the music and displayed on the user device when the user is watching the video.

The embodiment of the present disclosure will be further illustrated based on the abovementioned song determining method.

Figure 2A:
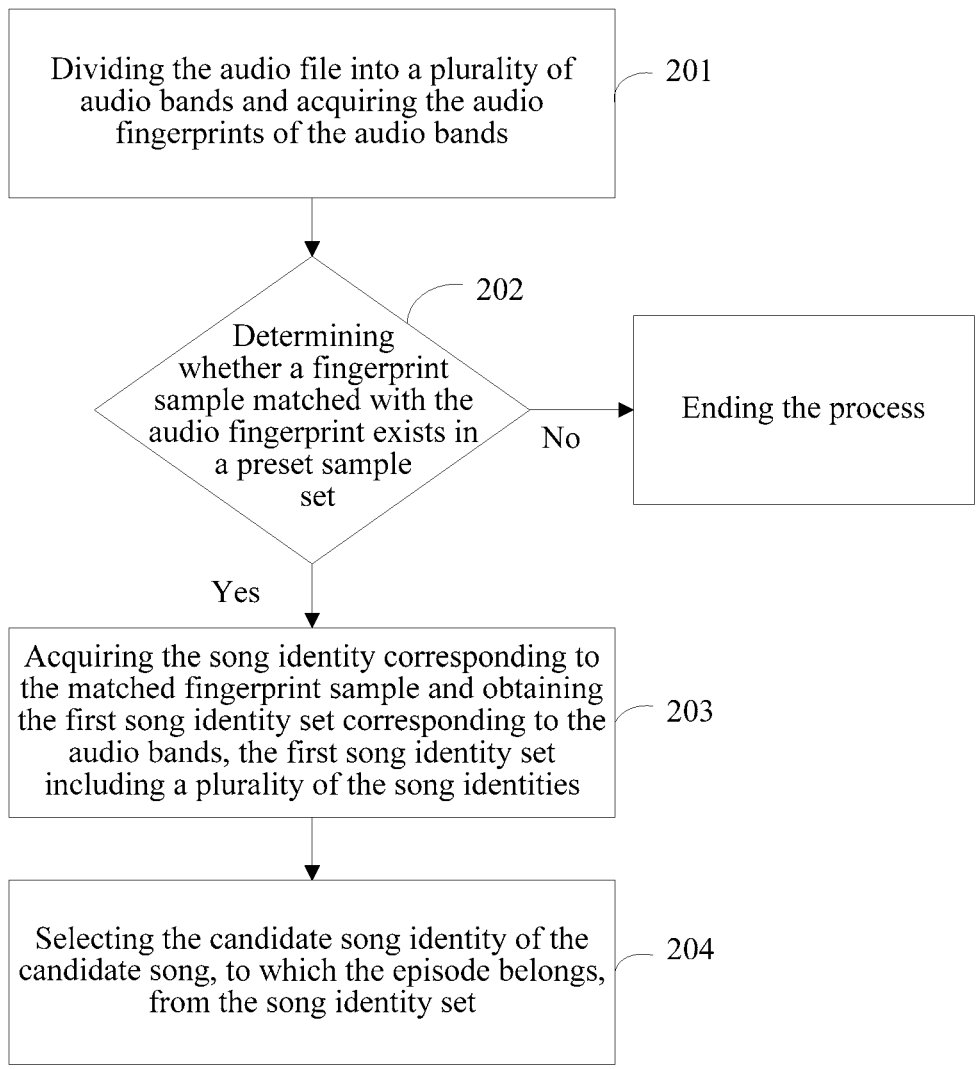
FIG. 2A is a flow diagram for acquiring a candidate song identification provided by the embodiment of the present disclosure.

As known from the abovementioned of the embodiment of the present disclosure, the candidate song identification can be acquired based on the audio fingerprint matching between the audio file in the video and the candidate song file, and according to the embodiment of the present disclosure, the process of acquiring the candidate song identification based on audio fingerprint matching will be emphasized, referring to FIG. 2A, the procedure of acquiring the candidate song identification is as follows:

Step 201, dividing the audio file into a plurality of audio bands, and acquiring the audio fingerprints of the audio bands.

For example, there are many manners available for dividing the audio file, for instance, the audio file can be divided into a plurality of audio bands according to preset frame length and preset frame shift, and the duration of each audio band is equal to the preset frame length, that is, the step of dividing the audio file into a plurality of audio bands may include:

converting the audio file into an audio frequency of a corresponding format; and dividing the audio file into a plurality of audio bands according to preset frame length and preset frame shift.

For example, the audio file is converted into 8 k 16-bit (that is, a quantized audio frequency of 16 bits, with 8*1024 sampling rate) pulse code modulation (PCM), also called as audio frequency, then the audio file is divided into a plurality of small audio bands, each of which lasts for ten seconds, by taking ten seconds as the frame length and one second as the frame shift, for instance, when the duration of each frame is one second, the first to the tenth frames are divided to be one audio band, and the second to the eleventh frames are divided to be one audio band. In specific implementation, a proper dividing manner can be selected according to actual needs.

According to the embodiment of the present disclosure, there are many manners available for the audio fingerprints, in order to reduce the calculated amount and promote the supplemental content filling speed, tiny audio fingerprint can be selected, and the tiny audio fingerprint is a kind of data structure, which can be formed by the combination of frequency spectrum peak points on the frequency spectrum, for example, acquiring the corresponding frequency spectrum of the audio frame of the audio frequency and then extracting the corresponding frequency spectrum peak points of the audio frame so as to obtain the frequency spectrum peak points corresponding to the audio frequency, and then combining the peak points in the set two by two so as to obtain the audio fingerprint; that is, the step of acquiring the audio fingerprint of the audio band may include:

acquiring the corresponding frequency spectrum of the audio frame in the audio band;

extracting the corresponding frequency spectrum peak points of the audio frame from the frequency spectrum so as to obtain the corresponding peak set of the audio band, the peak set including corresponding frequency spectrum peak points of the audio frame; and combining the frequency spectrum peak points in the peak set two by two so as to obtain the audio fingerprint of the frequency band.

In an implementation manner of the embodiment of the present disclosure, the step of combining the frequency spectrum peak points in the peak set two by two so as to obtain the audio fingerprint of the frequency band may include:

determining a target frequency spectrum peak point combined with the frequency spectrum peak point; and combining the frequency spectrum peak point with the target frequency spectrum peak point so as to obtain the audio fingerprint of the audio band, the audio fingerprint including the corresponding frequency of the frequency spectrum peak point, and time difference and frequency difference between the frequency spectrum peak point and the target frequency spectrum peak point.

According to the abovementioned, the target frequency spectrum peak point combined with the frequency spectrum peak point may be a frequency spectrum peak point except the frequency spectrum peak point; for example, after acquiring the corresponding peak set of the audio band, generating a frequency peak point distribution diagram according to the peak set, and then determining a target region corresponding to a certain frequency peak point (also called as an anchor point) in the frequency peak point distribution diagram, the target region including the target frequency peak point combined with the frequency peak point, and then combining the anchor point with the target frequency peak point in the target region, thus obtaining a plurality of audio fingerprints.

For example, a certain frequency spectrum peak point a1 (t1, f1) is combined with a target frequency spectrum peak point a2 (t2, f2) in the target region to form an audio fingerprint D1 (f1, $\Delta f'$, $\Delta t'$), wherein frequency $\Delta f'=f2-f1$, $\Delta t'=t2-t1$, and t1 may be offset time of the fingerprint D1 in the audio band; similarly, the frequency spectrum peak point a1 (t1, f1) is respectively combined with the target frequency spectrum peak points a3 (t3, f3) and a4 (t4, f4) in the target region, so as to obtain audio fingerprints D2 (f1, $\Delta f''$, $\Delta t''$) and D2 (f1, f1, $\Delta f'''$, $\Delta t'''$), wherein $\Delta f''=f3-f1$, $\Delta t''=t3-t1$, $\Delta f'''=f4-f1$, $\Delta t'''=t4-t1$, and so on, then an audio fingerprint set corresponding to the audio band can be obtained.

According to the abovementioned, the horizontal axis of the frequency peak point distribution diagram represents time, the vertical axis represents the frequency of the peak point, and because a corresponding relationship exists between the audio frame and time, in order to quickly acquire the audio fingerprint, according to the embodiment of the present disclosure, an audio frame serial number can be used for representing time; in addition, a frequency band index number can be used for representing the frequency of the peak point, and the scope of the index number may be (0-255), namely, the peak points t and f can be respectively represented by the audio frame serial number and the frequency band index number. At the moment, the target region can be represented by the audio frame serial number and the frequency band index number, for example, the target region may be formed by a time region and a frequency domain region, wherein the time region may be (15-63) frames (the time difference is represented by 6-bit), the frequency domain region may be (−31-31) frequency bands (the frequency band difference is represented by 6-bit), and the size of the target region can be set according to actual needs; in order to save resources and promote the fingerprint acquiring speed, in an implementation manner of the embodiment of the present disclosure, the target region only include three target frequency spectrum peak points, that is, the number of the target frequency spectrum peak points corresponding to the anchor point is three.

In an implementation manner of the embodiment of the present disclosure, in order to accurately extract the audio fingerprint, uniform distribution of the frequency spectrum peak points needs to be guaranteed, and therefore, peak point filtering needs to be performed on the peak set of the audio band, for example, peak points with mutual influence are filtered out, for instance, when people perceive sound, the peak frequency points of short-time spectra influence one another, one frequency component possibly masks similar frequency components (namely the so-called audio masking effect), and therefore, peak points with relatively small time interval and relatively small frequency interval need to be filtered out, so as to guarantee that the distribution of the selected peak points along time and frequency axes is relatively uniform; that is, after the step of obtaining the corresponding peak set of the audio band and before the step of combining the frequency spectrum peak points in the peak set two by two, the song determining method may also include:

filtering the frequency spectrum peak points in the peak set according to the time difference and the frequency difference among the frequency spectrum peak points.

Figure 2B:
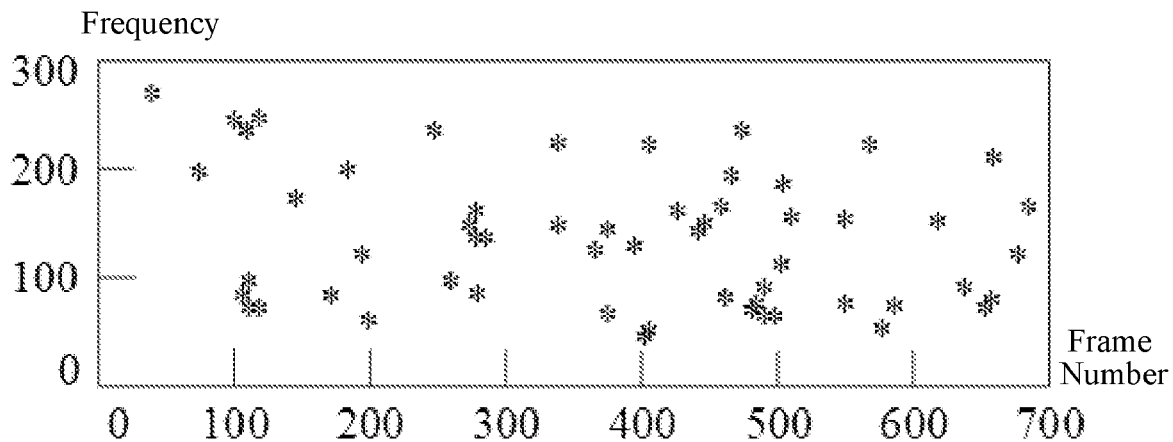
FIG. 2B is a frequency spectrum peak point distribution diagram provided by the embodiment of the present disclosure.
Figure 2C:
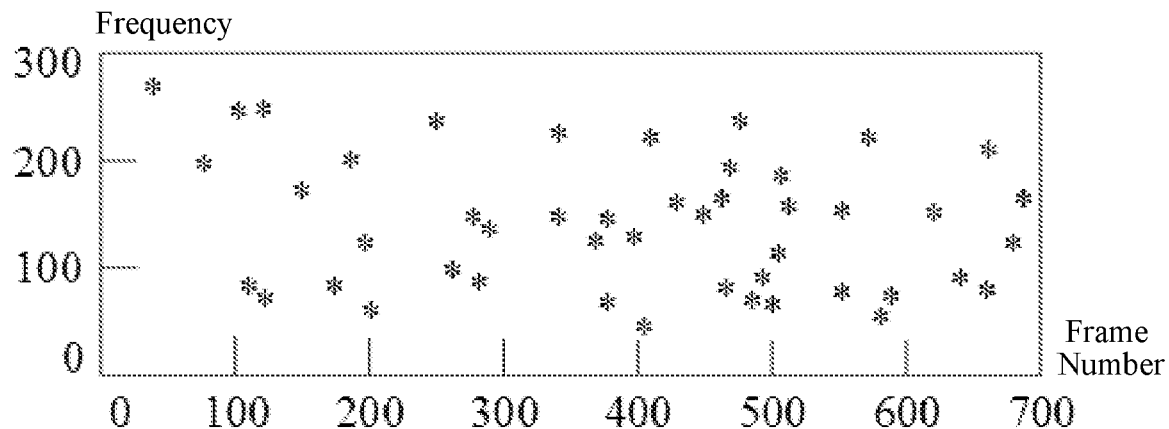
FIG. 2C is a filtered frequency spectrum peak point distribution diagram provided by the embodiment of the present disclosure.

FIG. 2B is the corresponding frequency spectrum peak point distribution diagram of the peak set of a certain audio frequency, and in order to ensure that the frequency spectrum peak points are uniformly distributed, peak points in the peak set can be filtered, and frequency spectrum peak point distribution corresponding to the filtered peak set can be known by referring to FIG. 2C.

In order to be distinguished from the abovementioned audio fingerprint (namely audio feature), for example, distinguishing based on the size of the audio fingerprint, audio feature in the embodiment 1 can be called as a big audio fingerprint, and the audio fingerprint of the audio band based on the record of FIG. 2C in the embodiment of the present disclosure can be called as a tiny audio fingerprint.

Step 202, determining whether a fingerprint sample matched with the audio fingerprint exists in a preset sample set, if so, executing step 203, and if not, ending the procedure.

According to the abovementioned, the preset sample set can include at least one kind of fingerprint sample, and each kind of fingerprint sample in the preset sample set is the audio fingerprint of a song; for example, the preset sample set can include multiple kinds of fingerprint samples, and each kind of fingerprint sample can correspond to one song ID, for instance, the fingerprint sample 1 corresponds to the song 1, the fingerprint sample 2 corresponds to the song 2, . . . , the fingerprint sample n corresponds to the song n.

For example, a plurality of audio fingerprints of the audio band can be acquired, then whether a fingerprint sample matched with (that is, the same as) each audio fingerprint exists in the preset sample set is determined, so as to obtain a plurality of matched fingerprint samples, and then the song identification corresponding to each matched fingerprint sample can be acquired so as to obtain a song identification set, the song identification set including a plurality of the song identifications. For example, for a certain audio band, when audio fingerprints corresponding to the audio band include audio fingerprint D1 and audio fingerprint D2, the audio fingerprint D1 of the audio band is compared with each of the fingerprint samples in the preset sample set, if a fingerprint sample the same as the audio fingerprint D1 exists, it can be determined that a fingerprint sample matched with the audio fingerprint D1 exists in the preset sample set; similarly, the audio fingerprint D2 is compared with each of the fingerprint samples in the preset sample set, and if a fingerprint sample the same as the audio fingerprint D2 exists, it can be determined that a fingerprint sample matched with the audio fingerprint D2 exists in the preset sample set.

According to the embodiment of the present disclosure, a song can be extracted from a song database, then the audio fingerprint of the song is extracted to be used as a fingerprint sample, wherein a manner for extracting the audio fingerprint of the song may also adopt the abovementioned audio fingerprint acquiring manner of the audio band, so that the corresponding frequency spectrum of the audio frame in the song can be acquired, and then the frequency spectrum peak points can be extracted, and the frequency spectrum peak points can be combined two by two so as to obtain the audio fingerprint (namely, the fingerprint sample) of the song; the song may be extracted from a certain song database; that is, before the step 201, the song determining method may also include:

acquiring a song from the song database; and
acquiring the corresponding audio fingerprint of the song, and taking the corresponding audio fingerprint of the song as the fingerprint sample, so as to obtain a preset sample set.

Step 203, acquiring the song identification corresponding to the matched fingerprint sample so as to obtain a first song identification set corresponding to the audio band, the first song identification set including a plurality of the song identifications.

According to the abovementioned, there are many manners available for acquiring the song identification corresponding to the matched fingerprint sample, for example, acquiring the song identification corresponding to the matched fingerprint sample by adopting a mapping relationship set, the mapping relationship set can include a mapping relationship (namely a corresponding relationship) between the fingerprint sample and the song identification, that is, specific step of the step of acquiring the song identification corresponding to the matched fingerprint sample includes:

acquiring the song identification corresponding to the matched fingerprint sample based on the mapping relationship set, the mapping relation set including a mapping relationship between the fingerprint sample and the song identification.

According to the abovementioned, the mapping relationship set may be a preset mapping relationship set, the mapping relationship between the fingerprint sample and the song identification may be preset by a system and may also be set by a user independently; that is, before the step of extracting the audio file in the video, the song determining method may also include:

receiving a mapping relationship setting request, the mapping relationship setting request indicates the fingerprint sample and the song identification needing to establish the mapping relationship; and establishing the mapping relationship between the fingerprint sample and the song identification according to the mapping relationship setting request so as to obtain a mapping relationship set.

According to the embodiment of the present disclosure, the mapping relationship set may be presented in the form of a table, which is called as a mapping relationship table, and the mapping relationship table may include the preset sample set and the song identification corresponding to the fingerprint sample in the preset sample set, wherein the mapping relationship table can be stored in a certain database, which can be called as a fingerprint database.

Step 204, selecting the candidate song identification from the candidate song, to which the segment belongs, from the song identification set.

According to the embodiment of the present disclosure, after the song identification set corresponding to the audio band is acquired, further screening is needed, so as to acquire a song identification that is most possibly matched with the audio band; because the song (namely, the candidate song, to which the segment belongs) that is most possibly matched with the audio band is related to the start time of the audio band in the song corresponding to the song identification, the candidate song identification of the candidate song, to which the segment belongs, can be selected from the song identification set based on the start time of the audio band in the song; that is, after the step of acquiring the audio fingerprint and before the step of selecting the candidate song identification from the song identification set, the method may further include: acquiring the first offset time of the audio fingerprint in the audio band and the second offset time of the matched fingerprint sample in the matched song, wherein the first offset time is the time of the frequency spectrum peak point in the audio band, and the matched song is a song corresponding to the song identification;

at the moment, the step of selecting the candidate song identification of the candidate song, to which the segment belongs, from the song identification set may include:

acquiring the start time of the audio band in the matched song according to the first offset time and the second offset time; and selecting the candidate song identification from the song identification set according to the start time of the audio band in the matched song.

For example, the offset time t1 of the audio fingerprint D1 (f1, Δf, Δt') in the audio band can be acquired, t1 is the time of the frequency spectrum peak point a1 in the audio band, similarly, when the fingerprint sample is extracted by adopting the abovementioned manner, the offset time of the fingerprint sample in the belonged song is the time of the frequency spectrum peak point (namely, the anchor point) corresponding to the fingerprint sample in the belonged song.

For example, according to the embodiment of the present disclosure, the offset time of the matched fingerprint sample in the matched song can be acquired based on the preset time mapping relationship set, and the preset time mapping relationship set may include a mapping relationship (a corresponding relationship) between the fingerprint sample and the offset time of the fingerprint sample in the belonged song, that is, the step of acquiring the second offset time of the matched fingerprint sample in the matched song may include:

acquiring the second offset time of the matched fingerprint sample in the corresponding matched song of the song identification, wherein the preset time mapping relationship set includes a mapping relationship between the fingerprint sample and the offset time of the fingerprint sample in the belongs song.

According to the abovementioned, the preset time mapping relationship set may be a preset time mapping relationship set, and the mapping relationship between the fingerprint sample and the offset time may be preset by the system, and may also be set by a user independently; that is, before the step of extracting the audio file in the video, the supplemental content filling method may also include:

receiving a time mapping relationship setting request, the time mapping relationship setting request indicates the fingerprint sample and the offset time needing to establish the mapping relationship, and the offset time is the offset time of the fingerprint sample in the belonged song; and establishing the mapping relationship between the fingerprint sample and the offset time according to the time mapping relationship setting request so as to obtain a time mapping relationship set.

According to the embodiment of the present disclosure, the time mapping relationship set can be presented in the form of a table, which is called as a time mapping relationship table, and the mapping relationship table may include the preset sample set and the offset time corresponding to the fingerprint sample in the preset sample set.

In an implementation manner of the embodiment of the present disclosure, in order to facilitate acquisition of the song identification and the offset time, the time mapping relationship set and the abovementioned mapping relationship set are arranged in the same mapping relationship set, for example, setting a general mapping relationship set, and the set may include the mapping relationship between the fingerprint sample and the song identification and the mapping relationship between the fingerprint sample and the offset time; for instance, a general mapping relationship table can be set, and the relation table may include: the preset sample set, the song identification corresponding to the fingerprint sample in the preset sample set, and the corresponding offset time of the fingerprint sample in the preset sample set.

In practical application, if the audio band has the same start time in multiple different songs, indicating that the multiple songs are most possibly songs matched with the audio band, namely, the candidate songs, to which the video segment belongs, that is, the step of acquiring the candidate song identification from the song identification set according to the corresponding start time of the song identification in the song identification set may include:

acquiring the corresponding start time of the song identification in the song identification set so as to obtain a time set;

determining a target start time from the time set according to the same number of the start time; and selecting the song identification corresponding to the target start time from the song identification set to be used as the candidate song identification.

For example, the start time with same number reaching preset number can be selected as the target start time, that is, the step of determining a target start time from the time set according to the same number of the start time may include:

acquiring the number of each such start time in the time set;

judging whether the number is greater than a preset number; and if so, determining the abovementioned start time as the target start time.

According to the abovementioned, the preset number can be set according to actual needs, and for instance, it may be 5, 6, 9, etc.

According to the embodiment of the present disclosure, the start time of the audio band in the song can be obtained according to the corresponding offset time of the audio fingerprint and the corresponding offset time of the song identification in the song identification set, for example, time difference between the corresponding offset time of the song identification and the corresponding offset time of the audio fingerprint can be calculated, and the time difference is the start time of the audio band in the song. For example, when the corresponding offset time of the audio fingerprint of the audio band is t' and the corresponding offset time (namely the corresponding offset time of the song identification) of the matched fingerprint sample is t", the start time of the audio band in the song corresponding the song identification, namely, the corresponding start time of the song identification, is $\Delta t = t'' - t'$; by adopting the manner, the corresponding start time $\Delta t$ of each song identification in the song identification set can be calculated so as to obtain a time set, such as ($\Delta t1$, $\Delta t2$, $\Delta t1$, $\Delta t1$ $\Delta t2$, $\Delta t3$, ..., $\Delta t3$, ..., $\Delta tn$).

After the time set is obtained, the number of each start time can be acquired, then whether the number is greater than a preset number can be judged, if so, determining the abovementioned start time as the target start time; for example, when the preset number is 8, the statistic number of $\Delta t1$ is 10, the statistic number of $\Delta t2$ is 6, and the statistic number of $\Delta t3$ is 12, the number of $\Delta t1$ is greater than the preset number, the number of $\Delta t2$ is less than the preset number, and the number of $\Delta t3$ is greater than the preset number, and then $\Delta t1$ and $\Delta t3$ can be determined as the start time.

In an implementation manner of the embodiment of the present disclosure, in order to increase the audio fingerprint matching speed, the audio fingerprint can be converted, for example, the audio fingerprint may be converted into a specific characteristic digit by adopting a preset algorithm, named as hash value (hash_key). For example, for the audio fingerprint D1 (f1, $\Delta f'$, $\Delta t'$), the following formula can be adopted: hash_key=f1·2^12+$\Delta f$·2^6+$\Delta t$, wherein ^ is an index operator and is converted into a specific digit, that is, a 20-bit integer is formed according to bit, and therefore, during audio fingerprint matching in the following procedure, only hash_key matching is needed, that is, the step of determining whether a fingerprint sample matched with the audio fingerprint exists in the preset sample set may include:

converting the audio fingerprint into a corresponding characteristic digit;

determining whether a digit sample matched with the characteristic digit exists in a preset digit set;

if so, determining that a fingerprint sample matched with the audio fingerprint exists in the preset sample set; and if not, determining that a fingerprint sample matched with the audio fingerprint does not exist in the preset sample set.

According to the abovementioned, a preset digit sample set includes at least one characteristic digit, called as a digit sample, and each digit sample may correspond to one song identification.

At the moment, the step of acquiring the song identification corresponding to the matched fingerprint sample may include: acquiring the song identification corresponding to the matched digit sample.

For example, the song identification corresponding to the matched digit sample can be acquired based on a digit mapping relationship set, that is, the step of acquiring the song identification corresponding to the matched digit sample may include: acquiring the song identification corresponding to the matched digit sample according to the digit mapping relationship set, wherein the digit mapping relationship set includes a corresponding relationship between a digit sample and the song identification.

According to the abovementioned, the digit mapping relationship set may be a preset digit mapping relationship set, and the mapping relationship between the digit sample and the song identification can be preset by the system, and may also be set by a user independently; that is, before the step of extracting the audio file in the video, the song determining method may also include:

acquiring the audio fingerprint of the song and converting the audio fingerprint into a digital feature;

receiving a digit mapping relationship setting request, the digit mapping relation setting request indicating the digital feature and the song identification needing to establish the mapping relationship; and acquiring the mapping relationship between the digital feature and the song identification according to the digit mapping relationship setting request so as to obtain a digit mapping relationship set.

Similarly, the step of acquiring the second offset time of the matched fingerprint sample in the matched song may include: acquiring the second offset time corresponding to the matched digit sample according to the digit time mapping relationship set, wherein the digit time mapping relationship set includes the mapping relationship between the digit sample and the offset time. For example, the acquiring manner of the digit time mapping relationship set may be performed by referring to the abovementioned establishing manner of the digit mapping relationship set or the time mapping relationship set, and unnecessary details will not be given here.

In an implementation manner of the embodiment of the present disclosure, the digit mapping relationship set and the digit time mapping relationship set may be arranged in one set, for example, one general mapping relationship set is arranged, and the set includes the mapping relationship between the digit sample and the song identification and the mapping relationship between the digit sample and the offset time; for example, a mapping relationship table can be arranged, and the mapping relationship table may include the preset digit sample set, the song identification corresponding to the digit sample in the preset digit sample set, and the offset time corresponding to the digit sample in the preset digit sample set.

For example, the song can be acquired from the song database, then the audio fingerprint of the song and the corresponding offset time can be acquired, the audio fingerprint can be converted into a characteristic digit hash_key, then a hash_table can be created, and the hash_table includes multiple hash records; each hash record includes {hash_key}:(value), wherein hash_key=f1·2^12+$\Delta f$·2^6+$\Delta t$ (a 20-bit integer is formed according to bits), value={song_id: t_1}, represented by 32-bit digit, wherein song_id occupies 19-bit (which can represent 520,000 songs), and t1 occupies 13-bit (if the frame shift is 0.032 ms, it can be indicated that the duration of the longest song is 5 min).

From the foregoing, according to the embodiment of the present disclosure, the audio file is divided into a plurality of audio bands, and the audio fingerprints of the audio bands are acquired; then whether a fingerprint sample matched with the audio fingerprint exists in the preset sample set is determined, if so, the song identification corresponding to the matched fingerprint sample is acquired, a first song identification set corresponding to the audio band is obtained, and the candidate song identification of the candidate song, to which the segment belongs, is selected from the song identification set; according to the scheme, all candidate songs, to which the video segment belongs can be acquired, and then the song corresponding to the video segment is determined from the candidate song based on the matching of the candidate song and the audio frequency of the video; compared with related technology, the accuracy and efficiency for determining the song corresponding to the video segment can be increased.

Moreover, according to the embodiment of the present disclosure, because the audio fingerprint is created by adopting the frequency spectrum peak points, the candidate song corresponding to the video segment and the identification thereof can be accurately acquired, and the accuracy for determining or positioning the candidate song, to which the video segment belongs, is further increased.

Figure 3A:
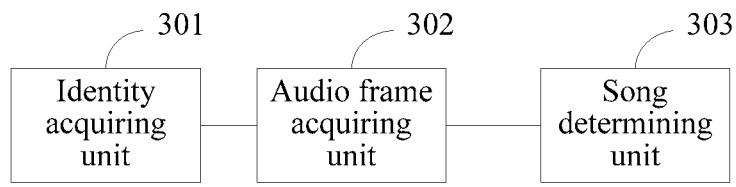
FIG. 3A is a structure schematic diagram of a first song determining device provided by the embodiment of the present disclosure.

The embodiment of the present disclosure further provides a song determining device, as shown in FIG. 3A, the song determining device may also include an identification acquiring unit 301, an audio frame acquiring unit 302 and a song determining unit 303, which are shown as follows:

(1) The identification acquiring unit 301;

the identification acquiring unit 301 is configured to extract the audio file in the video and acquire the candidate song identification of the candidate song, to which the segment belongs, in the audio file, so as to obtain a candidate song identification set.

For example, the identification acquiring unit 301 may include an audio extracting subunit, a fingerprint acquiring subunit, a determining subunit, an identification set acquiring subunit and a selecting subunit;

the audio extracting subunit is configured to extract the audio file in the video;

the fingerprint acquiring subunit is configured to divide the audio file into a plurality of audio bands and acquire the audio fingerprints of the audio bands;

the determining subunit is configured to determine whether a fingerprint sample matched with the audio fingerprint exists in the preset sample set;

the identification set acquiring subunit is configured to acquire the song identification corresponding to the matched fingerprint sample when determining that a fingerprint sample matched with the audio fingerprint exists and obtain the song identification set corresponding to the audio band, the song identification set including a plurality of the song identifications; and the selecting subunit is configured to select the candidate song identification of the candidate song, to which the segment belongs, from the song identification set.

According to the abovementioned, there are many manners available for acquiring the video, for example, sending a request to a video server, or extracting the video from local storage; that is, the audio extracting subunit may be specifically configured as follows:

sending a video acquiring request to the video server;

receiving a video returned by the video server according to the video acquiring request; and extracting the audio file in the video.

There are many manners available for extracting the audio file in the video, for example, performing audio and video separating processing on the video so as to obtain the audio file of the video; that is, the step of extracting the audio file in the video may include: performing audio and video separating processing on the video so as to obtain the audio file of the video.

For example, there are many manners available for dividing the audio file, for instance, the audio file can be divided into a plurality of audio bands according to preset frame length and preset frame shift, and the duration of each audio band is equal to the preset frame length.

According to the embodiment of the present disclosure, the candidate song, to which the segment belongs, may be a song that is possibly matched with the video segment, and the candidate song identification is the identification of the song that is matched with the video segment.

For example, there are manner manners available for acquiring the audio fingerprints of the audio bands, such as the following manners:

acquiring the frequency spectrum corresponding to the audio frame in the audio band;

extracting the frequency spectrum peak points corresponding to the audio frames from the frequency spectrum so as to obtain a peak set corresponding to the audio bands, the peak set including the frequency spectrum peak points corresponding to the audio frames; and combining the frequency spectrum peak points in the peak set two by two so as to obtain the audio fingerprints of the audio bands.

For example, the step of combining the frequency spectrum peak points in the peak set two by two so as to obtain the audio fingerprints of the audio bands may include:

combining the frequency spectrum peak points in the peak set two by two so as to obtain the audio fingerprints of the audio bands.

In an implementation manner of the embodiment of the present disclosure, there are many manners available for selecting the candidate song identification from the song identification set, for example, acquiring based on the offset time of the audio fingerprint, that is, the song determining device may also include an offset time acquiring unit, the offset time acquiring unit being configured to acquire the first offset time of the audio fingerprint in the audio band and the second offset time of the matched fingerprint sample in the matched song after the fingerprint acquiring subunit acquires the audio fingerprint and before the selecting subunit selects the candidate song identification, wherein the first offset time is the time of the frequency spectrum peak points in the audio bands, and the matched song is the song corresponding to the song identification;

at the moment, the selecting subunit may be specifically configured as follows:

acquiring the start time of the audio bands in the matched song according to the first offset time and the second offset time; and selecting the candidate song identification from the song identification set according to the start time of the audio bands in the matched song.

For example, the selecting subunit is specifically configured as follows:

acquiring the start time corresponding to the song identification in the song identification set so as to obtain a time set;

determining the target start time from the time set according to the number of the start time; and selecting the song identification corresponding to the target start time from the song identification set to be taken as the candidate song identification.

(2) The audio frame acquiring unit 302;

the audio frame acquiring unit 302 is configured to acquire the candidate song file corresponding to the candidate song identification and acquire the matched audio frame, in which the candidate song file is matched with the audio file so as to obtain the matched audio frame unit, wherein the matched audio frame unit includes multiple continuous audio frame.

For example, the audio frame acquiring unit 302 may specifically include a matching subunit, a first acquiring subunit and a second acquiring subunit;

the matching subunit is configured to match the audio features of the first audio frames in the candidate song file with the audio features of the second audio frames in the audio file so as to obtain a matching result;

the first acquiring subunit is configured to acquire a matched audio frame, in which the candidate song file is matched with the audio file, according to the matching result; and the second acquiring subunit is configured to acquire a matched audio frame unit according to the matched audio frame.

According to the abovementioned, the matching subunit is specifically configured as follows:

acquiring the frame number of the first audio frames in the candidate song file and selecting the audio frame unit from the audio file, the audio frame unit including second audio frames equaling to the frame number in quantity;

matching the audio features of the first audio frames in the candidate song file with the audio features of the second audio frames in the audio frame unit so as to obtain an audio feature matching result;

at the moment, the first acquiring subunit is specifically configured to acquire the matched audio frame, in which the candidate song file is matched with the audio file, according to the audio feature matching result, and the matched audio frame is the audio frame successful in audio feature matching;

the second acquiring subunit is specifically configured as follows:

acquiring a frame continuous unit according to the matched audio frame, the frame continuous unit including a plurality of the continuous matched audio frame; and acquiring the number of the matched audio frame in the frame continuous unit and determining the frame continuous unit as the matched audio frame unit according to the number.

In an implementation manner of the embodiment of the present disclosure, the song determining device disclosed by the embodiment of the present disclosure may also include a feature acquiring unit, the feature acquiring unit being configured to acquire the audio features corresponding to the first audio frames in the candidate song file after the identification acquiring unit 301 acquires the candidate song identification and before the matching subunit performs feature matching.

For example, the feature acquiring unit may be specifically configured as follows:

acquiring the frequency spectrum corresponding to each first audio frame in the candidate song file;

dividing the frequency spectrum corresponding to the first audio frame into preset number of frequency bands and acquiring the average amplitude corresponding to the frequency bands;

comparing the average amplitude of each of the frequency bands with the average amplitude of the frequency band corresponding to the last first audio frame so as to obtain a comparison result; and acquiring the audio features corresponding to the first audio frame according the comparison result.

For example, the candidate song file is converted into an audio frequency (8 k 16-bit audio frequency) of a preset format; then Fourier transformation is performed by taking a first preset number of sampling points as a frame and a second preset number of sampling points as frame shift so as to obtain a frequency spectrum (for example, Fourier transformation is performed by taking 1856 sampling points as a frame and 58 sampling points as frame shift); then the frequency spectrum is equally divided into a third preset number (for example 32) of frequency bands, and the average amplitude value corresponding to each frequency band is calculated; then each frequency band is compared with a corresponding frequency band in the last frame (the first frequency band in the second audio frame is compared with the first frequency band in the first audio frame, the second frequency band in the second audio frame is compared with the second frequency band in the first audio frame, and so forth, until all the frequency bands are compared); if the frequency band is greater than the corresponding frequency band in the last frame, the result is 1, and if the frequency band is smaller than the corresponding frequency band in the last frame, the result is 0, and therefore, each frame will obtain a data unit formed by a third preset number of bit values, and the data unit is the audio feature of the present frame; for example, under the condition of dividing the frequency spectrum into 32 frequency bands, each audio frame will obtain a data unit containing 32 bit values, and the 32 bit values are the audio feature of each audio frame.

(3) The song determining unit 303;

the song determining unit 303 is configured to acquire the target song identification from the candidate song identification set according to the matched audio frame unit corresponding to the candidate song identification, and determining the target song, to which the segment belongs, according to the target song identification.

For example, the song determining subunit 303 may specifically include an audio frame extension subunit, a time acquiring subunit, an identification acquiring subunit and a song determining subunit;

the audio frame extension subunit is configured to perform audio frame extension on the matched audio frame unit corresponding to the candidate song identification so as to obtain a matched song fragment corresponding to the candidate song identification;

the time acquiring subunit is configured to acquire time information corresponding to the candidate song identification according to the matched song fragment, the time information including: first start time of the matched song fragment in the video, second start time of the matched song fragment in the candidate song and the duration of the matched song fragment;

the identification acquiring subunit is configured to acquire the target song identification from the candidate song identification set according to the time information corresponding to the candidate identification; and the song determining subunit is configured to determine the target song, to which the segment belongs, according to the target song identification.

According to the abovementioned, the audio frame extension subunit may be specifically configured as follows:

respectively performing audio frame extension on the matched audio frame unit in the candidate song file and the audio file, so as to obtain a first matched audio frame extension unit in the candidate song file and a second matched audio frame extension unit in the audio file;

matching the audio features of the first audio frames in the first matched audio frame extension unit with the audio features of the second audio frames in the second matched audio frame extension unit, so as to obtain the matched audio frames between the extension units; and determining the first matched audio frame extension unit or the second matched audio frame extension unit as the matched song fragment, in which the candidate song is matched with the audio file, according to the quantity of the matched audio frames between the extension units.

According to the abovementioned, the identification acquiring subunit may be specifically configured as follows:

acquiring the playing time corresponding to the candidate song identification according to the second start time corresponding to the candidate song identification and the duration, the playing time being the playing time of the matched song fragment in the video;

filtering the candidate song identification in the candidate song identification set according to the playing time corresponding to the candidate song identification so as to obtain a filtered candidate identification set; and taking the candidate song in the filtered candidate identification set as the target song identification of the target song, to which the segment belongs.

For example, after acquiring the playing time corresponding to the candidate song identification, the candidate song identification with the playing time having an inclusion relationship can be determined, then the candidate song identification with the playing time included can be filtered out; for another example, after acquiring the playing time corresponding to the candidate song identification, the candidate song identification with playing time having an overlapping relationship can be determined, and then the candidate song identification with relatively short playing duration can be filtered out.

Figure 3B:
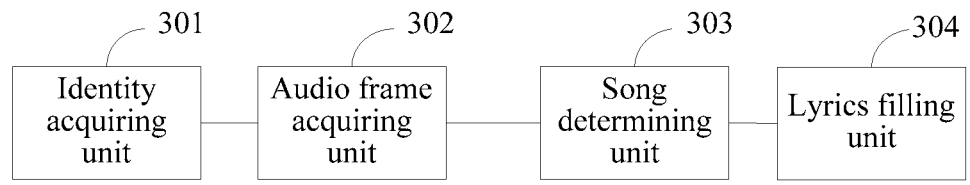
FIG. 3B is a structure schematic diagram of a second song determining device provided by the embodiment of the present disclosure.

In an implementation manner of the embodiment of the present disclosure, referring to FIG. 3B, based on the FIG. 3A, the song determining device disclosed by the embodiment of the present disclosure may also include a supplemental content filling unit 304;

the supplemental content filling unit 304 is configured to fill the supplemental content corresponding to the segment to the video according to the target song identification and the corresponding matched audio frame unit;

accordingly, for the identification acquiring subunit and the song determining subunit in the song determining unit 303:

the identification acquiring subunit is configured to acquire the target song identification from the candidate song identification set according to the time information corresponding to the candidate song identification; and the song determining subunit is configured to determine the target song, to which the segment belongs, according to the target song identification.

For example, the song filling unit 304 may include a supplemental content acquiring subunit and a filling subunit;

the supplemental content acquiring subunit is configured to acquire the supplemental content corresponding to the segment according to the target song identification, the corresponding first start time thereof and the duration; and the filling subunit is configured to fill the supplemental content to the video according to the second start time corresponding to the target song identification and the duration.

For example, the target supplemental content file corresponding to the target song can be acquired according to the target song identification, and then the supplemental content corresponding to the segment can be extracted from the target supplemental content file according to the start time of the matched song fragment in the target song and the duration of the matched song fragment, that is, the supplemental content acquiring subunit may be specifically configured as follows:

acquiring the supplemental content file corresponding to the target song according to the target song identification; and extracting the corresponding supplemental content from the supplemental content file according to the first start time corresponding to the target song identification and the duration to be taken as the supplemental content of the song.

For another example, the filling subunit may be specifically configured as follows:

acquiring the showing time of the supplemental content in the video according to the second start time corresponding to the target song and the duration; and filling the supplemental content to the video according to the showing time.

Figure 3C:
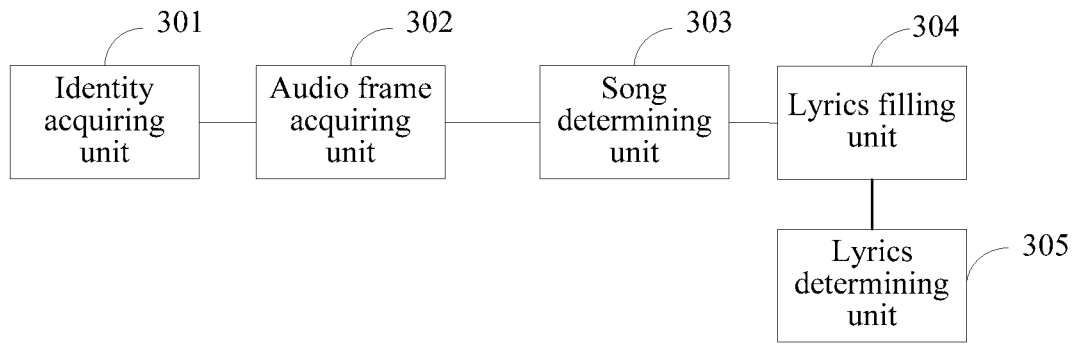
FIG. 3C is a structure schematic diagram of a third song determining device provided by the embodiment of the present disclosure.

In an implementation manner of the embodiment of the present disclosure, in order to show segment supplemental content with complete sentences and promote user experience, whether the supplemental content are complete sentences can be determined after the segment supplemental content are acquired, and if so, the supplemental content filling operation is performed; that is, the song determining device disclosed by the embodiment of the present disclosure may also include a supplemental content determining unit 305, referring to FIG. 3C;

the supplemental content determining unit 305 may be configured to determine whether the supplemental content are complete sentences after the supplemental content filling unit 304 acquires the supplemental content corresponding to the segment and before the supplemental content are filled to the video; and at the moment, the supplemental content filling unit 304 may be specifically configured to execute the step of filling the supplemental content to the video according to the second start time corresponding to the target song identification and the duration when the supplemental content determining unit 305 determines that the supplemental content are complete sentences.

In an implementation manner of the embodiment of the present disclosure, according to the embodiment of the present disclosure, an interface can be arranged in the video, so that when the video segment is played, it can be switched to the song, to which the video segment belongs, via the interface; that is, the supplemental content filling method disclosed by the embodiment of the present disclosure may also include: an interface setting unit;

the interface setting unit may be configured to set an interface in the video according to the target song identification after the song determining unit 303 acquires the target song identification of the segment, so that a terminal can switch to play the target song, to which the segment belongs, via the switching interface while playing the segment.

According to the abovementioned, there are many manners available for the switching interface, such as a button, and input box, and the switching interface may also be set according to actual needs.

In an implementation manner of the embodiment of the present disclosure, the interface setting unit may also be configured to set an adding interface in the video according to the target song identification after the song determining unit 303 acquires the target song identification, so that a terminal can add the target song to the song list of music software via the adding interface while playing the segment.

In specific implementation, all of the abovementioned units may be implemented as independent entities, and may also be realized as one entity or a plurality of entities by being combined randomly, the specific implementation of each of the units can be realized by referring to the abovementioned embodiment of the method, and unnecessary details will not be given here.

From the foregoing, according to the embodiment of the present disclosure, the identification acquiring unit 301 of the song determining device extracts the audio file in the video and acquires the candidate song identification of the candidate song, to which the segment belong, in the audio file, so as to obtain the candidate song identification set, then the audio frame acquiring unit 302 acquires the candidate song identification corresponding to the candidate song identification and acquires the matched audio frame, in which the candidate song file is matched with the audio file, so as to obtain the matched audio frame unit, wherein the matched audio frame unit includes multiple continuous matched audio frames, and the song determining unit 303 acquires the target song identification from the candidate song identification set according to the matched audio frame unit corresponding to the candidate song identification and determines the target song, to which the segment belongs, according to the target song identification;

according to the scheme, the candidate song identification set of the candidate song, to which the video segment belongs, can be acquired first, and then the identification of the song, to which the video segment belongs, can be selected from the candidate song identification set based on the matched audio file between the audio file of the video and the song, so as to determine the song, to which the video segment belongs. Relative to related technology, the accuracy and efficiency for determining or positioning the song corresponding to the video segment can be increased.

In addition, the device disclosed by the embodiment of the present disclosure can also fill the supplemental content corresponding to the segment to the video according to the target song identification and the corresponding matched audio frame unit after determining the song, to which the video segment belongs; according to the scheme, matching between the video segment and the song can be automatically completed, so as to determine the song, to which the video segment belongs, and the supplemental content of the video segment can be automatically acquired for filling. Relative to related technology, the accuracy and efficiency for filling supplemental content of the video segment can be increased.

Figure 4:
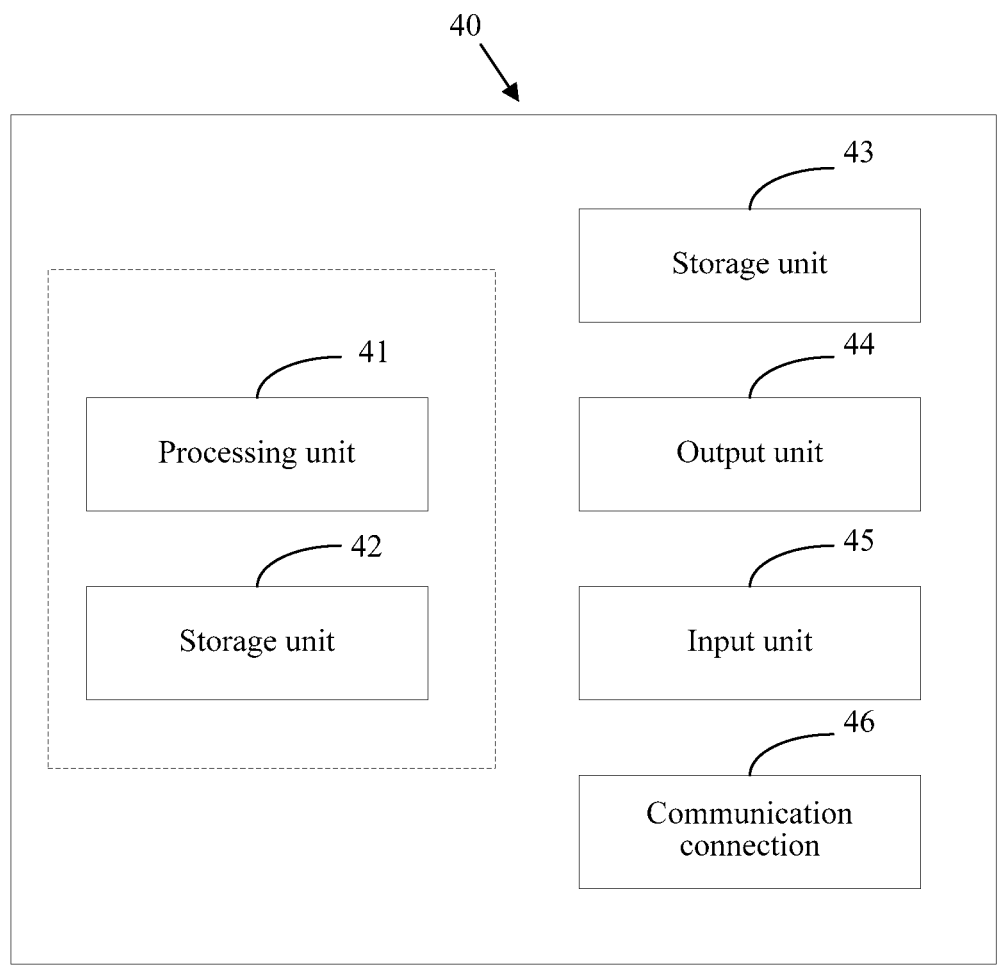
FIG. 4 is a schematic diagram of hardware of the song determining device provided by the embodiment of the present disclosure.

FIG. 4 exemplarily shows the schematic diagram of the structure of the song determining device 40 provided by the embodiment of the present disclosure. The structure shown by FIG. 4 is only an example of a proper structure and is not aimed at suggesting any limitation related to the structure of the song determining device 40. The song determining device 40 may be realized in a server computer, a minicomputer, a mainframe computer and the distributed computing environment of any one of the abovementioned equipment.

Although it is not required, the embodiment is described under the common background that a computer readable instruction is executed by one or a plurality of song determining devices. The computer readable instruction can be distributed via a computer readable medium (which will be discussed in the following passage). The computer readable instruction may be realized as a program module, such as a function, an object, an application programming interface (API) and a data structure executing a specific task or realizing a specific abstract data type. Typically, the functions of the computer readable instruction can be randomly combined or distributed in various environments.

FIG. 4 shows an example including the structure of the song determining device 40 provided by the embodiment of the present disclosure. In a configuration, the song determining device 40 include at least one processing unit 41 and a storage unit 42. According to the exact configuration and type of the song determining device, the storage unit 42 may be volatile (for example, a random access memory, RAM), nonvolatile (for example, a read only memory, ROM) or a certain combination of the two. The configuration is represented by the dotted line in FIG. 4.

In other embodiments, the song determining device 40 may include supplementary features and/or functions. For example, the song determining device 40 may further include a supplementary storage device (such as that removable and/or non-removable), including but not limited to a magnetic storage device, an optical storage device and the like. The supplementary storage device is represented by a storage unit 43 in FIG. 4. In an embodiment, the computer readable instruction of one or a plurality of embodiments provided by the embodiment of the present disclosure may be stored in the storage unit 43. The storage unit 43 may also store other computer readable instructions for realizing an operation system, an application program and the like. The computer readable instructions may be loaded to the storage unit 42 to be executed, for instance by the processing unit 41.

The item 'computer readable medium' used by the embodiment of the present disclosure includes a computer storage medium. The computer storage medium includes volatile and nonvolatile or removable and non-removable media which are realized by any method or technology used for storing information of the computer readable instructions or other data. The storage unit 42 and the storage unit 43 are examples of the computer storage medium. The computer storage medium includes but is not limited to RAM, ROM, an electrically erasable programmable read-only memory, flash memory or other memory technologies, CD-ROM, a DVD or other optical storage devices, cassette tapes, tapes, disk storage devices or other magnetic storage devices, or any other medium that can be used for storing expected information and can be accessed by the song determining device 40. Any such computer storage medium can be a part of the song determining device 40.

The song determining device 40 may further include communication connection 46 allowing communication of the song determining 49 with other equipment. The communication connection 46 may include but is not limited to a modulator-demodulator, an NIC, an integrated network interface, a radio frequency transmitter/receiver, an infrared port, USB connection or other interfaces used for connecting the song determining device 40 to other song determining devices. The communication connection 46 may include wired connection or wireless connection. The communication connection 46 can transmit and/or receive a communication medium.

The item 'computer readable medium' may include a communication medium. The communication medium typically includes the computer readable instruction or other data in 'modulated data signals' of carriers or other transmission mechanisms and the like, and includes any information transmission medium. The item 'modulated data signals' may include the following signals: signals, one or a plurality of characteristics of which are set or changed according to a manner of encoding the information to the signals.

The song determining device 40 may include an input unit 45, such as a keyboard, a mouse, a pen, voice input equipment, touch input equipment, an infrared camera, video input equipment and/or any other input equipment. The song determining device 40 may also include an output unit 44, such as one or more displays, a loudspeaker, a printer and/or any other output equipment. The input unit 45 and the output unit 44 may be connected to the song determining device 40 by wired connection, wireless connection or any combination thereof. In an embodiment, input equipment or output equipment of another song determining device can be used as the input unit 45 or the output unit 44 of the song determining device.

Components of the song determining device 40 may be connected by various interconnections (such as a bus). Such interconnection may include peripheral component interconnect (PCI), (for example, rapid PCI), universal serial bus (USB), a firing line (IEEE 1394), an optical bus structure and the like. In another embodiment, the components of the song determining device 40 may be interconnected via network. For example, the storage unit 42 may be formed by a plurality of physical storage units which are located in difference physical positions and are interconnected by internet.

According to the abovementioned, detailed introduction is made for the song determining method, device and the storage medium provided by the embodiment of the present disclosure, in the present article, specific cases are applied to illustrate the principle and the implementation manners of the present disclosure, and the illustration of the abovementioned embodiments is only used for helping to understand the method of the present disclosure and the core concept; and meanwhile, those skilled in the art can make changes in the detailed implementation manners and the application scope according to the concept of the present disclosure. To sum up, the content of the present disclosure should not be understood as limitation to the present disclosure.

What is claimed is:

1. A song determining method performed at a computing device having one or more processors and memory storing a plurality of programs to be executed by the one or more processors, the method comprising:
   receiving a user instruction to display a supplemental content for an audio content played in a video while the user is watching the video on a user interface at a user device;
   in response to the user instruction, extracting an audio file corresponding to the audio content played in the video;
   obtaining one or more candidate song identifications of one or more candidate songs, to which a segment of the audio content belongs, so as to obtain a candidate song identification set including the one or more candidate song identifications;
   for a respective candidate song of the one or more candidate songs, acquiring a candidate song file corresponding to the respective candidate song identification and acquiring a matched audio frame from the candidate song file that matches the segment of the audio content;
   forming a matched audio frame unit based on one or more matched audio frames acquired based on matches between the segment of the audio content and one or more candidate song files of the one or more candidate songs respectively, wherein the matched audio frame unit includes multiple continuous matched audio frames;
   acquiring a target song identification from the candidate song identification set according to a match between the matched audio frame unit and a matched candidate song identification and time information associated with the target song identification, the time information further including a first timestamp of a starting point of the matched audio frame unit in the video, a second timestamp of a starting point corresponding to the target song identification, and a duration of the matched song frame unit;
   determining a target song, to which the segment of the audio content belongs according to the target song identification;
   acquiring the supplemental content corresponding to the segment of the audio content according to the target song identification, the corresponding first timestamp, and the duration; and
   matching the supplemental content for the audio content to the video according to the second timestamp corresponding to the target song identification and the duration, such that the supplemental content is displayed with the corresponding audio content while playing the video on the user interface at the user device.

2. The song determining method of claim 1, wherein the step of acquiring a target song identification from the candidate song identification set according to a match between the matched audio frame unit and a matched candidate song identification includes:
   respectively performing audio frame extension on the matched audio frame unit in the candidate song file and the audio file, so as to obtain a first matched audio frame extension unit in the candidate song file and a second matched audio frame extension unit in the audio file;
   matching the audio features of the first audio frames in the first matched audio frame extension unit with the audio features of the second audio frames in the second matched audio frame extension unit, so as to obtain the matched audio frames between the extension units; and
   determining the first matched audio frame extension unit or the second matched audio frame extension unit as the matched song fragment, in which the candidate song is matched with the audio file, according to the quantity of the matched audio frames between the extension units.

3. The song determining method of claim 1, wherein the steps of acquiring a matched audio frame, in which the candidate song file is matched with the audio file, and forming a matched audio frame unit based on the acquired matched audio frame include:
   matching the audio features of first audio frames in the candidate song file with the audio features of second audio frames in the audio file so as to obtain a matching result;
   acquiring the matched audio frame, in which the candidate song file is matched with the audio file, according to the matching result; and
   acquiring the matched audio frame unit according to the matched audio frame.

4. The song determining method of claim 3, wherein the step of matching the audio features corresponding to the first audio frames in the candidate song file with the audio features corresponding to the second audio frames in the audio file so as to obtain a matching result includes:
   acquiring frame number of the first audio frames in the candidate song file, and selecting an audio frame unit from the audio file, the audio frame unit including the second audio frames equaling to the frame number in quantity; and matching the audio features of the first audio frames in the candidate song file with the audio features of the second audio frames in the audio file so as to obtain an audio feature matching result;

the step of acquiring a matched audio frame, in which the candidate song file is matched with the audio file, according to the matching result includes:

acquiring the matched audio frame, in which the candidate song file is matched with the audio file, according to the audio feature matching result; and the step of acquiring a matched audio frame unit according to the matched audio frame includes:

acquiring a frame continuous unit according to the matched audio frame, the frame continuous unit including multiple continuous matched audio frames; and acquiring the quantity of the matched audio frames in the frame continuous unit and determining the frame continuous unit as the matched audio frame unit according to the quantity.

5. The song determining method of claim 3, wherein, after acquiring the corresponding candidate song file according to the candidate song identification and before matching the audio features corresponding to the first audio frames in the candidate song file with the audio features corresponding to the second audio frames in the audio file, the song determining method further includes:

acquiring a frequency spectrum corresponding to each first audio frame in the candidate song file;

dividing the frequency spectrum corresponding to the first audio frame into preset number of frequency bands and acquiring the average amplitude corresponding to the frequency bands;

comparing the average amplitude of each frequency band with the average amplitude of a frequency band corresponding to the last first audio frame, so as to obtain a comparison result; and acquiring the audio features corresponding to the first audio frames according to the comparison result.

6. The song determining method of claim 1, further comprising:

acquiring a target song identity from the candidate song identity set according to the time information corresponding to the candidate identity; comprising:

acquiring playing time corresponding to the candidate song identification according to the second timestamp corresponding to the candidate song identification and the duration, the playing time being that of the matched song fragment in the video;

filtering the candidate song identification in the candidate song identification set according to the playing time corresponding to the candidate song identification, so as to obtain a filtered candidate identification set; and taking the candidate song in the filtered candidate identification set as a target song identification.

7. The song determining method of claim 1, further including:

after acquiring the supplemental content corresponding to the segment and before displaying the supplemental content to the video, determining whether the supplemental content includes complete sentences; and if so, executing the step of obtaining the supplemental content for display to the video according to the second timestamp corresponding to the target song identification and the duration.

8. The song determining method of claim 1, wherein the step of obtaining a candidate song identification of a respective candidate song, to which the segment of the audio content belongs, in the audio file further includes:

dividing the audio file into a plurality of audio bands and acquiring audio fingerprints of the respective audio bands;

determining whether a fingerprint sample matches an audio fingerprint exists in a preset sample set;

if so, acquiring the song identification corresponding to the matched fingerprint sample and obtaining the song identification set corresponding to the audio bands, the song identification set including a plurality of song identifications; and selecting the candidate song identification of the respective candidate song, to which the segment belongs, from the song identification set.

9. The song determining method of claim 1, wherein the step of acquiring audio fingerprints of the audio bands includes:

acquiring the frequency spectrum corresponding to the audio frame in the audio bands;

extracting frequency spectrum peak points corresponding to the audio frame from the frequency spectrum so as to obtain the peak set corresponding to the audio band, the peak set including the frequency spectrum peak points corresponding to the audio frame; and combining frequency spectrum peak points in the peak set two by two so as to obtain the audio fingerprint of the audio band.

10. The song determining method of claim 9, wherein the step of combining frequency spectrum peak points in the peak set two by two so as to obtain the audio fingerprint of the audio band includes:

determining a target frequency spectrum peak point combined with the frequency spectrum peak point; and combining the frequency spectrum peak point with the target frequency spectrum peak point so as to obtain the audio fingerprint of the audio band, the audio fingerprint including: the frequency corresponding to the frequency spectrum peak point, and time difference and frequency difference between the frequency spectrum peak point and the target frequency spectrum peak point.

11. The song determining method of claim 10, further including:

after acquiring the audio fingerprint and before selecting the candidate song identification, acquiring first offset time of the audio fingerprint in the audio band and second offset time of the matched fingerprint sample in the matched song, wherein the first offset time is the time of the frequency spectrum peak point in the audio band, and the matched song is a song corresponding to the song identification; and the step of selecting the candidate song identification of the candidate song, to which the segment belongs, from the song identification set includes:

acquiring start time of the audio band in the matched song according to the first offset time and the second offset time; and selecting the candidate song identification from the song identification set according to the start time of the audio band in the matched song.

12. The song determining method of claim 11, wherein the step of selecting the candidate song identification from the song identification set according to the start time corresponding to the song identification in the song identification set includes:

acquiring the start time corresponding to the song identification in the song identification set so as to obtain a time set;

determining a target start time from the time set according to the quantity of each start time; and selecting the song identification corresponding to the target start time in the song identification set as the candidate song identification.

13. The song determining method of claim 1, further including:

after acquiring the target song identification of the target song, to which the segment belongs, obtaining a visual indicator for display on the user interface;

obtaining a user interaction with the visual indicator; and in response to the user interaction, switching the user interface from a first application playing the video to a second application for playing the target song.

14. The song determining method of claim 1, further including:

after acquiring the target song identification, automatically adding the target song to a playlist associated with the user in a music application while playing the segment of the audio content of the video.

15. A song determining device having one or more processors, and memory storing a plurality of programs, wherein the plurality of programs, when executed by the one or more processors, cause the computing device to perform the following operations, including:

receiving a user instruction to display a supplemental content for an audio content played in a video while the user is watching the video on a user interface at a user device;

in response to the user instruction, extracting an audio file corresponding to the audio content played in the video;

obtaining one or more candidate song identifications of one or more candidate songs, to which a segment of the audio content belongs, so as to obtain a candidate song identification set including the one or more candidate song identifications;

for a respective candidate song of the one or more candidate songs, acquiring a candidate song file corresponding to the respective candidate song identification and acquiring a matched audio frame from the candidate song file that matches the segment of the audio content;

forming a matched audio frame unit based on one or more matched audio frames acquired based on matches between the segment of the audio content and one or more candidate song files of the one or more candidate songs respectively, wherein the matched audio frame unit includes multiple continuous matched audio frames;

acquiring a target song identification from the candidate song identification set according to a match between the matched audio frame unit and a matched candidate song identification and time information associated with the target song identification, the time information further including a first timestamp of a starting point of the matched audio frame unit in the video, a second timestamp of a starting point corresponding to the target song identification, and a duration of the matched song frame unit;

determining a target song, to which the segment of the audio content belongs according to the target song identification;

acquiring the supplemental content corresponding to the segment of the audio content according to the target song identification, the corresponding first timestamp, and the duration; and matching the supplemental content for the audio content to the video according to the second timestamp corresponding to the target song identification and the duration, such that the supplemental content is displayed with the corresponding audio content while playing the video on the user interface at the user device.

16. The song determining device of claim 15, wherein the operations further comprise:

after acquiring the target song identification of the target song, to which the segment belongs, obtaining a visual indicator for display on the user interface;

obtaining a user interaction with the visual indicator; and in response to the user interaction, switching the user interface from a first application playing the video to a second application for playing the target song.

17. The song determining device of claim 15, wherein the operations further comprise:

after acquiring the target song identification, automatically adding the target song to a playlist associated with the user in a music application while playing the segment of the audio content of the video.

18. A non-transitory computer readable storage medium storing a plurality of programs in connection with a computing device having one or more processors, wherein the plurality of programs, when executed by the one or more processors, cause the computing device to perform the following operations:

receiving a user instruction to display a supplemental content for an audio content played in a video while the user is watching the video on a user interface at a user device;

in response to the user instruction, extracting an audio file corresponding to the audio content played in the video;

obtaining one or more candidate song identifications of one or more candidate songs, to which a segment of the audio content belongs, so as to obtain a candidate song identification set including the one or more candidate song identifications;

for a respective candidate song of the one or more candidate songs, acquiring a candidate song file corresponding to the respective candidate song identification and acquiring a matched audio frame from the candidate song file that matches the segment of the audio content;

forming a matched audio frame unit based on one or more matched audio frames acquired based on matches between the segment of the audio content and one or more candidate song files of the one or more candidate songs respectively, wherein the matched audio frame unit includes multiple continuous matched audio frames;

acquiring a target song identification from the candidate song identification set according to a match between the matched audio frame unit and a matched candidate song identification, comprising:

performing audio frame extension on the matched audio frame unit corresponding to the candidate song identification, so as to obtain a matched song fragment corresponding to the candidate song identification; and acquiring time information corresponding to the candidate song identification according to the matched song fragment, wherein the time information includes: a first timestamp of a starting point of the matched song fragment in the video, a second timestamp of a starting point of the matched song fragment in the candidate song, and a duration of the matched song fragment;

determining a target song, to which the segment of the audio content belongs according to the target song identification;

acquiring the supplemental content corresponding to the segment of the audio content according to the target song identification, the corresponding first timestamp, and the duration; and matching the supplemental content for the audio content to the video according to the second timestamp corresponding to the target song identification and the duration, such that the supplemental content is displayed with the corresponding audio content while playing the video on the user interface at the user device.

19. The non-transitory computer readable storage medium of claim 18, wherein the operations further comprise:

after acquiring the target song identification of the target song, to which the segment belongs, obtaining a visual indicator for display on the user interface;

obtaining a user interaction with the visual indicator; and in response to the user interaction, switching the user interface from a first application playing the video to a second application for playing the target song.

20. The non-transitory computer readable storage medium of claim 18, wherein the operations further comprise:

after acquiring the target song identification, automatically adding the target song to a playlist associated with the user in a music application while playing the segment of the audio content of the video.

* * * * *

UNITED STATES PATENT AND TRADEMARK OFFICE
CERTIFICATE OF CORRECTION

PATENT NO. : 10,719,551 B2
APPLICATION NO. : 16/102478
DATED : July 21, 2020
INVENTOR(S) : Zhao Page 1 of 1

It is certified that error appears in the above-identified patent and that said Letters Patent is hereby corrected as shown below:

On the Title Page

Item (30) Foreign Application Priority Data, Line 1, please delete "Apr. 19, 2018" and insert
--Apr. 19, 2016--.

Signed and Sealed this
Twentieth Day of October, 2020

Andrei Iancu
*Director of the United States Patent and Trademark Office*